United States Patent [19]
Shang et al.

[11] Patent Number: 5,974,531
[45] Date of Patent: Oct. 26, 1999

[54] METHODS AND SYSTEMS OF STACK RENAMING FOR SUPERSCALAR STACK-BASED DATA PROCESSORS

[75] Inventors: Shi-Sheng Shang, Kaohsiung; Ruey-Liang Ma, I-Lan; Dze-Chaung Wang, Nantou, all of Taiwan

[73] Assignee: Industrial Technology Research Institute, Taiwan

[21] Appl. No.: 09/024,752

[22] Filed: Feb. 17, 1998

[51] Int. Cl.$^6$ .................................................. G06F 12/02
[52] U.S. Cl. .......................................... 712/202; 712/217
[58] Field of Search ..................................... 712/202, 217

[56] References Cited

U.S. PATENT DOCUMENTS

| | | | |
|---|---|---|---|
| 3,737,871 | 6/1973 | Katzman | 711/200 |
| 4,587,632 | 5/1986 | Ditzel. | |
| 4,704,679 | 11/1987 | Hassler et al. | 711/220 |
| 5,142,635 | 8/1992 | Saini. | |
| 5,319,757 | 6/1994 | Moore et al.. | |
| 5,564,031 | 10/1996 | Amerson et al. | 711/209 |
| 5,613,151 | 3/1997 | Dockser | 711/202 |
| 5,737,625 | 4/1998 | Jaggar | 712/41 |
| 5,838,940 | 11/1998 | Savkar et al. | 712/216 |
| 5,852,726 | 12/1998 | Lin et al. | 712/202 |

*Primary Examiner*—William M. Treat
*Attorney, Agent, or Firm*—Christensen O'Connor Johnson & Kindness PLLC

[57] ABSTRACT

Methods and systems are disclosed for exploring instruction-level parallelism in superscalar processors by renaming stack entries. In a first embodiment, the stack renaming is implemented in a parallel structure that renames the instructions in parallel. In a second embodiment, the stack renaming is implemented in a serial structure that renames the instructions serially. In a third embodiment, the stack renaming is implemented in a combined parallel-serial structure that renames the instruction partially in parallel and partially in series.

95 Claims, 8 Drawing Sheets

CALCULATING SRC_1(INSTRUCTION 1)=TOS+INSTRUCTION_1:REL_1
CALCULATING SRC_2(INSTRUCTION 1)=TOS+INSTRUCTION_1:REL_2
CALCULATING DEST(INSTRUCTION 1)=TOS+INSTRUCTION_1:SREL

---

CALCULATING SRC_1(INSTRUCTION $i$)=TOS+INSTRUCTION_1:SREL+
INSTRUCTION_2:SREL+...+INSTRUCTION_($i$-1):SREL+INSTRUCTION_$i$:REL_1

CALCULATING SRC_2(INSTRUCTION $i$)=TOS+INSTRUCTION_1:SREL+
INSTRUCTION_2:SREL+...+INSTRUCTION_($i$-1):SREL+INSTRUCTION_$i$:REL_2

CALCULATING DEST(INSTRUCTION $i$)=TOS+INSTRUCTION_1:SREL+
INSTRUCTION_2:SREL+...+INSTRUCTION_($i$-1):SREL+INSTRUCTION_$i$:SREL

WHERE $1 < i <= m$

---

COMPUTING SRC_1(INSTRUCTION $m$+1)=INSTRUCTION_$m$:DEST
+INSTRUCTION_($m$+1):REL_1
COMPUTING SRC_2(INSTRUCTION $m$+1)=INSTRUCTION_$m$:DEST
+INSTRUCTION_($m$+1):REL_2
COMPUTING DEST(INSTRUCTION $m$+1)=INSTRUCTION_$m$:DEST
+INSTRUCTION_($m$+1):SREL

---

COMPUTING SRC_1(INSTRUCTION $j$)=INSTRUCTION_$m$:DEST+
INSTRUCTION_($m$+1):SREL+INSTRUCTION_($m$+2):SREL+...+
INSTRUCTION_($j$-1):SREL+INSTRUCTION_$j$:REL_1

COMPUTING SRC_2(INSTRUCTION $j$)=INSTRUCTION_$m$:DEST+
INSTRUCTION_($m$+1):SREL+INSTRUCTION_($m$+2):SREL+...+
INSTRUCTION_($j$-1):SREL+INSTRUCTION_$j$:REL_2

COMPUTING DEST(INSTRUCTION $j$)=INSTRUCTION_$m$:DEST+
INSTRUCTION_($m$+1):SREL+INSTRUCTION_($m$+2):SREL+...+
INSTRUCTION_($j$-1):SREL+INSTRUCTION_$j$:SREL

WHERE $m+1 < j <= 2m$

---

COMPUTING ADDITIONAL INSTRUCTIONS, FROM $2m+1$ TO $n$ INSTRUCTIONS

METHODS AND SYSTEMS OF STACK RENAMING FOR SUPERSCALAR STACK-BASED DATA PROCESSORS

FIELD OF THE INVENTION

The present invention relates generally to microprocessors and, more particularly, to a superscalar processor that renames stacks to execute out-of-order instructions in an in-order sequence.

BACKGROUND OF THE INVENTION

The industrial boom in the demands for faster microprocessors has prompted microprocessor makers to shift the design of scalar pipelined processors to higher performance superscalar processors. The scalar pipelined processors, such as the Intel® 486 and MIPS® 3000, execute each instruction in a pipelined order and disallow out-of-order execution of instructions. High performance superscalar processors, such as the Intel® Pentium Pro, Motorola® PowerPC 604, and UltraJava by Sun Microelectronic, have displaced the previous scalar pipelined processors by providing the capability of executing out-of-order instructions in parallelism. Previous superscalar processors are registered-based in which the registers in a superscalar processor can be accessed randomly. In modern trend, the UltraJava-class microprocessors are implemented in stack-based designs in which the registers must be accessed with respect to a stack top location. Superscalar processors have multiple execution units and are designed based on a plurality of registers irrespective of superscalar processors that compute instructions as registers-based or stack-based stacks.

Stacks can be used to store intermediate evaluation results, return addresses, or local variables and subroutine parameters. An example of a stack-based instruction is a last-in-first-out (LIFO) stack management scheme which saves information in a temporary storage location for common computer operations, such as mathematical expression evaluations and subroutine callings. One advantage of designing a system with a stack-based processor is that the stack-based processor uses high code density while requires small program size, resulting in the adoption of zero-operand stack-based instruction sets that disallow any operand to be associated with an opcode. To phrase it in another way, all operations are implicitly specified to be performed at a top of the stack (TOS), also referred to as a stack top location.

Superscalar stack-based processors execute each instruction by accessing the data at the TOS as stored from the previous instruction. This dependency on the necessity to access the TOS in order to execute every execution undermines the effectiveness of pipelining instructions. In effect, a subsequent instruction cannot begin until the previous instruction has been executed, which potentially could cause pipeline data hazards. Thus, the inherent nature of the frequent access to the TOS in stack-based instructions results in heavy inter-instruction data dependency, particularly among adjacent instructions.

Accordingly, it is desirable to have methods and systems which explore instruction-level parallelism by renaming stack entries in superscalar processors.

SUMMARY OF THE INVENTION

The present invention overcomes the foregoing limitations by disclosing methods for renaming stacks, comprising the steps of: (1) decoding a first instruction to provide a first relative register location of a first operand relative to a first undetermined stack top location, a second relative register location of a second operand relative to the first undetermined stack top location, and a first stack relative pointer relative to the first undetermined stack top location; (2) renaming the first instruction from the first relative register location to a first physical register location, from the second relative register location to a second physical register location, and from a first stack relative pointer to a third physical register location, the first undetermined stack top location being set to a stack top location; (3) decoding a second instruction to provide a third relative register location of a first operand of the second instruction relative to a second undetermined stack top location, a fourth relative register location of a second operand of the second instruction relative to the undetermined second stack top location, and a second stack relative pointer relative to the undetermined second stack top location; and (4) renaming the second instruction from the third relative register location to a fourth physical register location, from the fourth relative register location of the second instruction to a fifth physical register location, from a second stack relative pointer to a sixth physical register location, the second undetermined stack top location being computed by summing the stack top location and the first stack relative pointer.

The stack renamer processes multiple instructions concurrently by using a stack top location associated with a preceding instruction and computes the physical register locations of the respective operand or operands corresponding to a particular instruction. Thus, unlike the stack-based processors that fixate the execution of each instruction to the stack top location so that the pipelining instructions must be executed serially, the stack renamer of the present invention processes multiple instructions concurrently relative to a present stack top location and thus facilitates one of the functional units to potentially perform parallel execution of multiple instructions. After the instructions have been renamed, the stack renamer dispatched the renamed instructions, first, to an operand read and ROB logger, and second, to an instruction window waiting for the execution of an instruction. A selected functional unit among the plurality of functional units is permitted to execute multiple instructions in parallel, provided the multiple instructions have no data dependency between them. However, if the selected instruction has data dependency with another instruction, the selected instruction is not eligible for parallel execution by a functional unit.

In a first embodiment, the stack renamer is implemented in a parallel structure that renames the instructions in parallel. In a second embodiment, the stack renamer is implemented in a serial structure that renames the instructions serially. In a third embodiment, the stack renaming is implemented in a parallel-serial structure that renames the instruction partially in parallel and partially in series.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6b is a flowgraph of the third embodiment of a stack renamer in a parallel-serial structure that executes the instructions partially in parallel and partially in serial.

DETAIL DESCRIPTION OF THE PREFERRED EMBODIMENT

Figure 1:
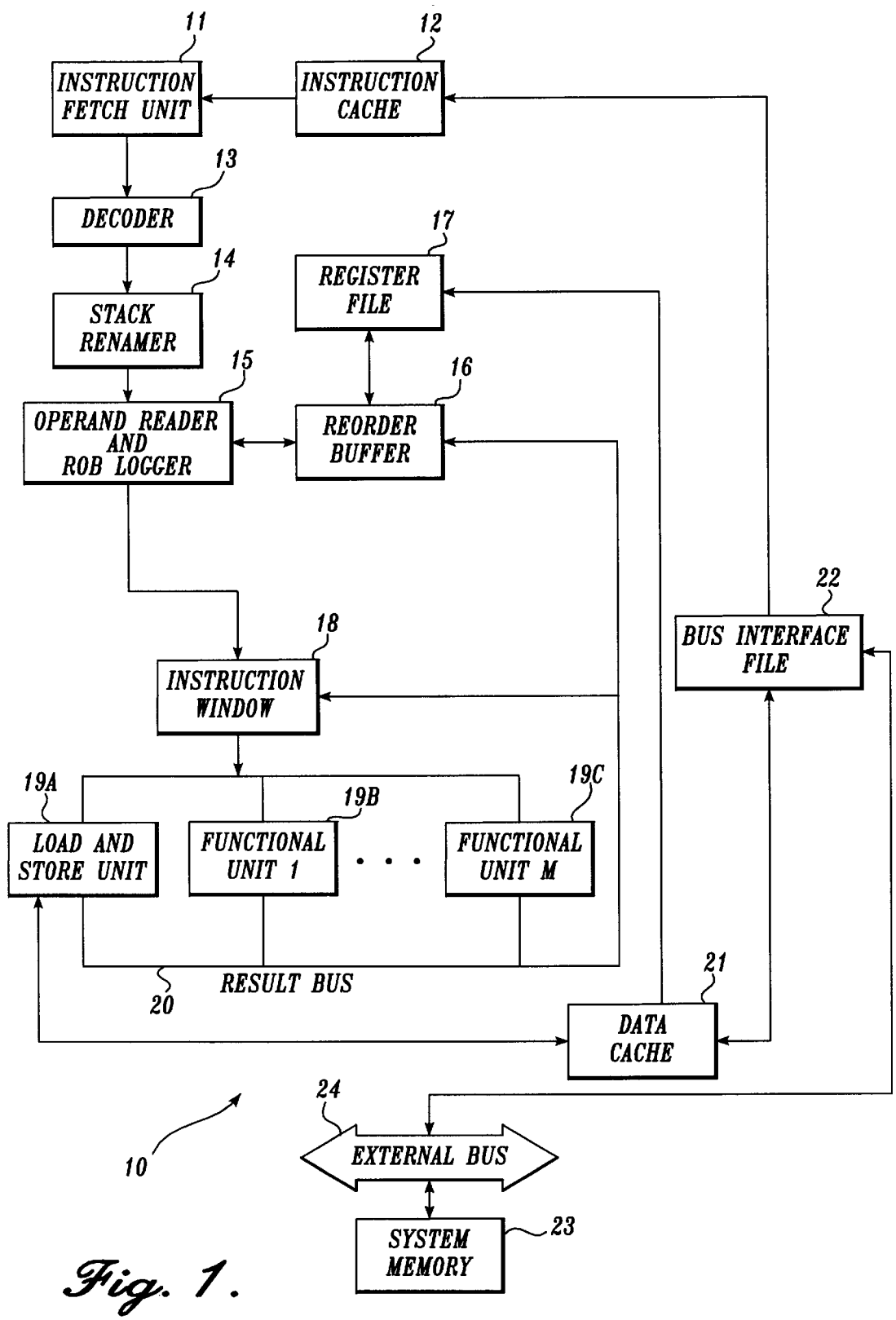
FIG. 1 is a general block diagram of a superscalar stack-based data processor that executes out-of-order instructions in an in-order sequence.

FIG. 1 shows a general block diagram of a superscalar stack-based data processor 10 computing out-of-order instructions in an in-order sequence. An instruction fetch unit 11 reads a plurality of instructions from an instruction cache 12. The plurality of instructions are fetched to a decoder 13 which decodes the plurality of instructions and sends the plurality of instructions to a stack renamer 14. The stack renamer 14 renames the decoded instructions and transmits the results to an operand reader and reorder buffer (ROB) logger 15. The operand reader and reorder buffer logger 15 may use a renamed tag to search a reorder buffer 16 to locate the most recent logged entries with the same tag containing the associated operands. If the renamed tag is unable to match with the existing tags, then the decoded instruction obtains the operand directly from a register file 17. While the search is conducted at operand reader and ROB logger 15, each of the decoded instructions is logged into the reorder buffer 16 by the operand reader and ROB logger 15. If the decoded instructions require to update a stack entry, the result of an execution is temporarily stored in an entry in the reorder buffer 16. When the instruction is ready to retire, the temporarily stored result will be written back to the register file 17.

The register file 17 operates as an on-chip stack cache to store the upper entries of a stack. The other elements in the stack are stored in a memory (not shown). Data processing is performed by accessing the stack cache. Conventional techniques, such as circular buffer and a spill/fill buffer, can be used for the operation and management of the stack cache to control the stack growth and shrinkage to avoid the overflow or underflow problems. A suitable system that implements these convention techniques is the Sun™ Microelectronic's picojava core (SME whitepaper wpr-0014-01 entitled "picojava I Microprocessor Core Architecture").

The decoded instructions are transmitted to an instruction window 18 awaiting for execution. Once the instruction window 18 receives the operands associated with a particular decoded instruction, the decoded instruction is scheduled in accordance to a predetermined criteria for dispatch to one of the functional units 19a, 19b, or 19 c. If the instruction window 18 has yet to receive the operands associated with other decoded instructions, these decoded instructions wait in a queue until their respective operands have arrived at the instruction window 18. The instruction window 18 constantly monitor a result bus 20 for operands that associate with the decoded instructions in the instruction window 18.

The functional units 19a, 19b, and 19c are intended to represent a typical superscalar stack-based processor that has M+1 functional units. The functional units 19a, 19b, and 19c units may include one load/store unit, such as the load and store unit 19a, and interconnect with the result bus 20, a data cache 21, integer arithmetic logic units (not shown), floating-point units (not shown), and multimedia units (not shown). The load and store unit 19a loads and stores information from the data cache 21. The register file 17 is used to write back data into the data cache. After the functional unit 19a, 19b, or 19c completes executing an instruction, the resulting information will be simultaneously written back to the reorder buffer 16 and the instruction window 18. If the execution of the instructions is completed, the instructions are serially retired from the reorder buffer 16 as well as updating the register file 17, if necessary. A bus interface 22 is coupled between the instruction cache 12 and the data cache 21 for receiving data from or sending data to a system memory 23 through an external bus 24.

Figure 2:
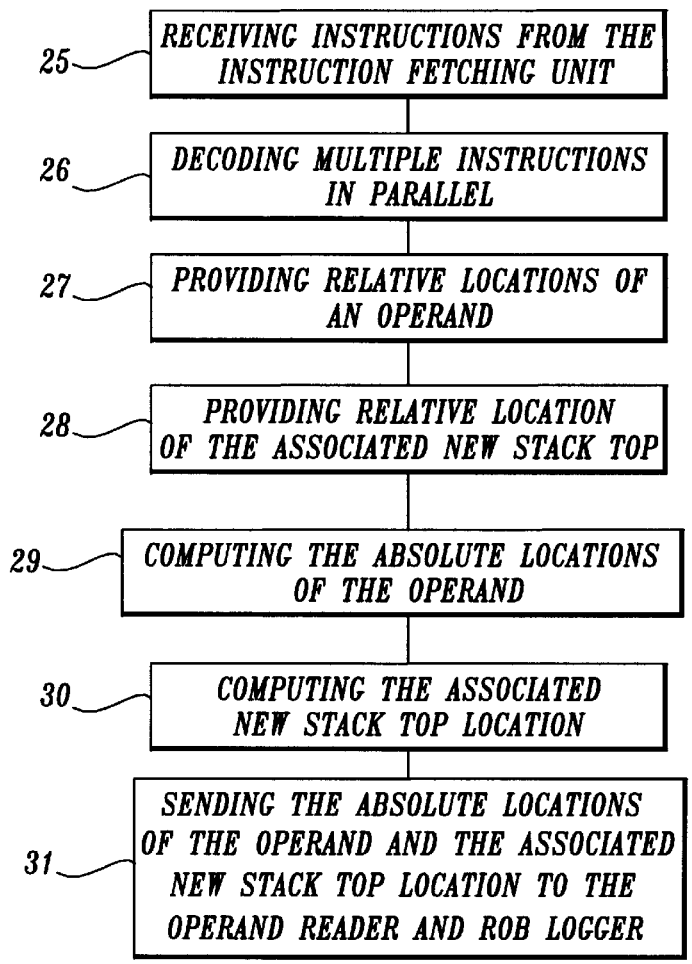
FIG. 2 is a flowgraph of the general process flow of renaming stacks in a superscalar stack-based data processor.

FIG. 2 is a flowgraph of the general process flow of renaming stacks in a superscalar stack-based data processor. At a step 25, the instruction fetch unit 11 receives multiple instructions from the instruction cache 12. At a step 26, the decoder 13 decodes the multiple instructions in parallel for processing in a superscalar system. The decoder 13 provides, at a step 27, the relative locations of an operand and at a step 28, provides the relative location of the associated new stack top location. At a step 29, the stack renamer 14 computes the absolute locations, also referred to as physical register locations, of the operand. At a step 30, the stack renamer 14 computes the associated new stack top location. At a step 31, the stack renamer 14 sends absolute locations of the operand and the associated new stack top location to the operand reader and ROB logger 15.

Table 1 illustrates a typical instruction set in the superscalar stack-based processor 10 that contains arithmetic and logical operators, stack manipulation, memory fetch and store, literal, and branch transfer. The arithmetic and logical operators generally include 2-operand operations, such as "add", "sub", "and", "or", and 1-operand operations, such as "neg", and "not". The stack manipulation operations, including "pop", "dup", and "swap", prepare operands to be used by other operations. The memory fetch and store operators transfer data between the TOS and a particular location in the data cache 21 or the system memory 23. The literal operators, such as "push", are usually followed by a numerical constant to be pushed into the stack. The branch transfer operators contain conditional branching, including "ifeq", "iflt,", "ifge", and unconditional branchings, including "jsr", "goto", and "ret".

TABLE 1

Stack Instructions

| Instruction | Input → Output | Functional description |
|---|---|---|
| add | n1 n2 → n3 | Add n1 and n2, giving n3 |
| not | n1 → n2 | Negate n1, giving n2 |
| pop | n1 → | Delete n1 from the stack |
| dup | n1 → n1 n1 | Duplicate n1, returning a second copy of it |

TABLE 1-continued

Stack Instructions

| Instruction | Input → Output | Functional description |
|---|---|---|
| | | on the stack |
| swap | n1 n2 → n2 n1 | Swap the order of the top two stack elements |
| fetch | addr → n1 | Fetch the value at an address location in a memory, returning n1 |
| store | n1 addr → | Store n1 at an address location in a memory |
| push n1 | → n1 | Push a literal n1 onto the stack |
| ifeq addr | n1 → | If n1 is equal to 0, perform a branch to an address location, otherwise continue |
| jsr addr1 | → addr2 | Perform a subroutine call to location addr1, giving a returning location addr2 onto the stack |
| goto addr | → | Perform a branch to the address location addr |
| ret | → | Perform a subroutine return |

The left-hand column of Table 1 is a list of a typical instruction set in the superscalar stack-based processor 10, including "add", "not", "pop", "dup", "swap", "fetch", "store", "push n1", "ifeq addr", "jsr addr1", "goto addr", and "ret" instructions. The middle column of Table 1 characterizes the number of operands required at the input to execute the corresponding instruction, and the stack relative location in which the operand of the executed instruction is placed in the stack relative location to the stack top location. The right-hand column of Table 1 provides the functional description in executing the instructions listed in Table 1. For example, in executing the instruction "add", the input sums the n1 and n2 operands retrieved from the stack top, and places the result, n3 operand, back in the stack. In executing the instruction "not", only a single operand n1 is required to perform the "not" instruction in which the result, n2 operand, is placed back in the stack. When executing the instruction "pop", the operand n1 is retrieved from the stack top and the operand n1 disappeared when the instruction "pop" pops the operand n1. For the "dup" instruction, the operand n1 is duplicated in which the output produces an operand n1 followed by another operand n1 in the consecutive stack locations. For the "swap" instruction, the operand n1 and the operand n2 at inputs are swapped in their respective stack positions to generate outputs of the operand n2 and the operand n1. The "fetch" instruction places an address operand at a stack top location which accesses and retrieves data from the data cache 21 or the system memory 23 to be placed at the stack top location. The "store" instruction writes both the operand n1 and the address operand from the stack top to the data cache 21 or the system memory 23 for storing the n1 at a location address in the memory. The "push n1" instruction pushes a literal operand n1 onto the stack. The "ifeq addr" instruction performs a branch to the addr if the operand n1 equals to zero; otherwise, the execution of the instructions continues if the operand n1 does not equal to zero. The "jsr addr1" instruction performs a subroutine call to location addr1, and returns addr2 to the stack. The "goto addr" instruction performs a branch to a location of the addr address. Lastly, the "ret" instruction performs a subroutine return. For instructions that have 2-operand operations, the top two stack elements are popped and operated, with the result being pushed back into the stack. For instructions that have an 1-operand operation, the top one stack element is popped and operated, with the result pushed back into the stack.

Figure 3:
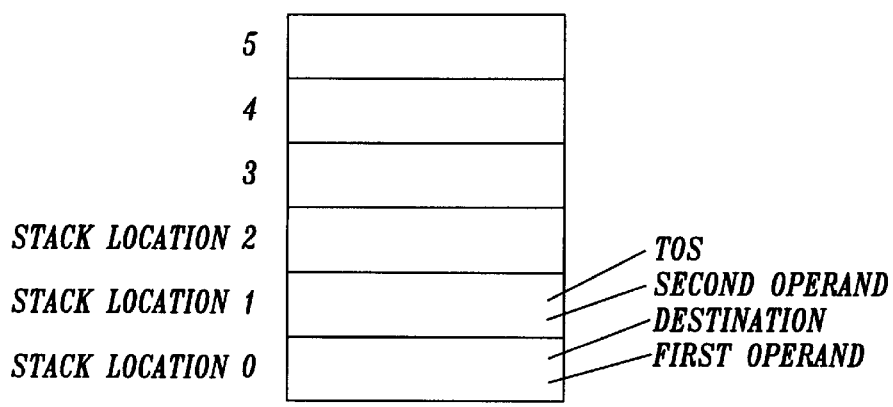
FIG. 3 is a flowgraph of executing the relative stack locations of an "add" instruction.

Table 2 shows the stack movements of relative locations of the instruction set listed in Table 1. For the two-operand arithmetic "add" instruction, the first operand is −1, the second operand is 0, and the stack top is −1. FIG. 3 illustrates the stack locations of the "add" instruction as described in Table 2. If the TOS is at a stack location 1, then the first operand for the "add" instruction is retrieved from the stack location 0 since the first operand is placed at −1 position relative to the TOS, which is the stack location 1. The second operand for the "add" instruction is retrieved from the stack location 1 since the second operand is placed at an "0" position relative to the TOS. After the first and second operands have summed together, the result, also referred to as a destination, is placed at the stack location 0 because the result is placed at the −1 location relative to the TOS. A don't care symbol "X" is used for instructions that do not require any operand.

TABLE 2

Instructions' Relative Locations

| Instruction | First Operand's Relative Location/ Second Operand's Relative Location/ Stack Top Relative Location | Description |
|---|---|---|
| add | −1/0/−1 | two-operand arithmetic |
| not | 0/X/0 | one-operand logical |
| pop | 0/X/−1 | stack manipulation |
| dup | 0/X/1 | stack manipulation |
| swap | −1/0/0 | stack manipulation |
| fetch | 0/X/0 | memory fetch |
| store | −1/0/−2 | memory store |
| push | X/X/1 | literal |
| ifeq | 0/X/−1 | branch transfer |
| jsr | X/X/1 | branch transfer |
| goto | X/X/0 | branch transfer |
| ret | X/X/0 | branch transfer |

Figure 4A:
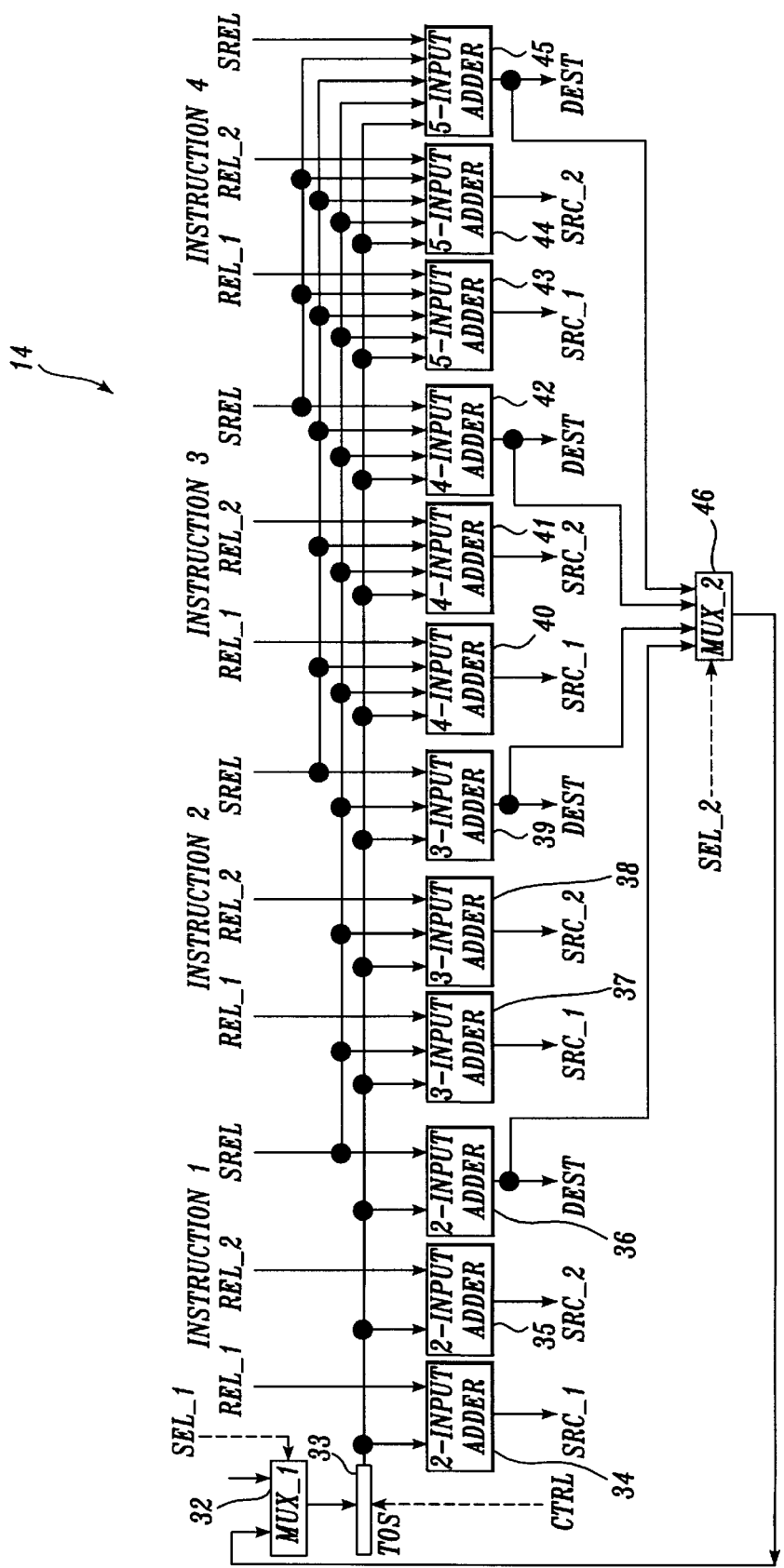
FIG. 4a is a schematic diagram of the first embodiment of a stack renamer in a parallel structure that executes instructions in parallel.

FIG. 4a is a schematic diagram of the first embodiment of a stack renamer 14 in a parallel structure that computes instructions in parallel. The stack renamer 14 includes a mux 32, a TOS register 33, a plurality of 2-input adders 34, 35, 36, a plurality of 3-input adders 37, 38, 39, a plurality of 4-input adders 40, 41, 42, a plurality of 5-input adders 43, 44, 45, and a mux 46. The decoder 13 provides the decoded instructions, such as an instruction 1, an instruction 2, an instruction 3, and an instruction 4 to the stack renamer 14 in FIG. 4a. Each of the decoded instructions produces Rel_1, Rel_2, and Srel where Rel_1 denotes the first operand's relative location with respect to the present TOS, Rel_2 denotes the second operand's relative location with respect to the present TOS, and Srel denotes the relative location of the subsequent TOS with respect to the present TOS. The bit widths of Rel_1, Rel_2, and Srel are typically small, ranging from 3 to 4 bits.

The execution of the instruction 1 processes data through the plurality of 2-input adders 34, 35, and 36. The 2-input adder 34 adds the two inputs containing the TOS and the first operand Rel_1, if required, to generate an output SRC_1, where SRC_1 denotes the location of the first operand in the register file 17. The 2-input adder 35 sums the two inputs containing the TOS and the second operand Rel_2, if required, to generate an output SRC_2, denoting the location of the second operand in the register file 17. The 2-input adder 36 sums the two inputs containing TOS and Srel to generate a DEST output, denoting the location in the register file 17 if data needs to be stored by the instruction 1, or denoting the most recent stack pointer after the instruction 1 has been executed for use with a subsequent instruction. The bit widths of SRC_1, SRC_2, and DEST are at least as wide as TOS. The bit width of TOS must be at least $Log_2N$ bits wide if the register file 17 has N entries.

In executing the instruction 2, the Srel from instruction 1 is connected to an input of each of the plurality of 3-input adders 37, 38, and 39. Each of the plurality of adders 37, 38, and 39 has a first input for receiving the TOS, a second input for receiving the Srel from the instruction 1, and a third input for receiving of Rel_1 Rel_2, or Srel of the instruction 2. The 3-input adder 37 adds a first input of the TOS, a second input of Srel from the instruction 1, and a third input of Rel_1 of the instruction 2 to produce an output of SRC_1 of the instruction 2. The 3-input adder 38 adds a first input of TOS, a second input of Srel from the instruction 1, and a third input of Rel_2 of the instruction 2 to produce an output SRC_2 of the instruction 2. The 3-input adder 39 adds a first input of the TOS, a second input of Srel from the instruction 1, and a third input of Srel of the instruction 2 to produce an output DEST for the instruction 2.

When executing the instruction 3, the Srel from the instruction 1 and the Srel from the instruction 2 are connected to each of the plurality of 4-input adders 40, 41, and 42. Each of the plurality of adders 40, 41, and 42 has a first input for receiving the TOS, a second input for receiving the Srel from the instruction 1, a third input for receiving the Srel from the instruction 2 and a fourth input for receiving of Rel_1, Rel_2, or Srel of the instruction 3. The 4-input adder 40 adds a first input of TOS, a second input of Srel from the instruction 1, a third input of Srel from the instruction 2 and a fourth input of Rel_1 of the instruction 3 to produce an output of SRC_1 of the instruction 3. The 4-input adder 41 adds a first input of the TOS, a second input of Srel from the instruction 1, a third input of Srel from the instruction 2, and a fourth input of Rel_2 of the instruction 3 to produce an output SRC_2 of the instruction 3. The 4-input adder 42 adds a first input of the TOS, a second input of Srel from the instruction 1, a third input of Srel from the instruction 2 and a fourth input of Srel of the instruction 3 to produce an output of DEST for the instruction 3.

The execution of the instruction 4 processes data through involves the plurality of 5-input adders 43, 44, and 45. Each of the plurality of adders 43, 44, and 45 has a first input for receiving the TOS, a second input for receiving the Srel from instruction 1, a third input for receiving the Srel from the instruction 2, a fourth input for receiving the Srel from the instruction 3 and a fifth input for receiving of Rel_1, Rel_2, or Srel of the instruction 4 . The 5-input adder 43 adds a first input of the TOS, a second input of Srel from the instruction 1, a third input of Srel from the instruction 2, a fourth input of Srel from the instruction 3 and a fifth input of Rel_1 of the instruction 4 to produce an output of SRC_1 of the instruction 4. The 5-input adder 44 adds a first input of the TOS, a second input of Srel from the instruction 1, a third input of Srel from the instruction 2, a fourth input of Srel from the instruction 3 and a fifth input of Rel_2 of the instruction 4 to produce an output of SRC_2 of the instruction 4. The 5-input adder 45 adds a first input of TOS, a second input of Srel from the instruction 1, a third input of Srel from the instruction 2, a fourth input of Srel from the instruction 3 and a fifth input of Srel of the instruction 4 to produce an output of DEST of the instruction 4.

Figure 4B:
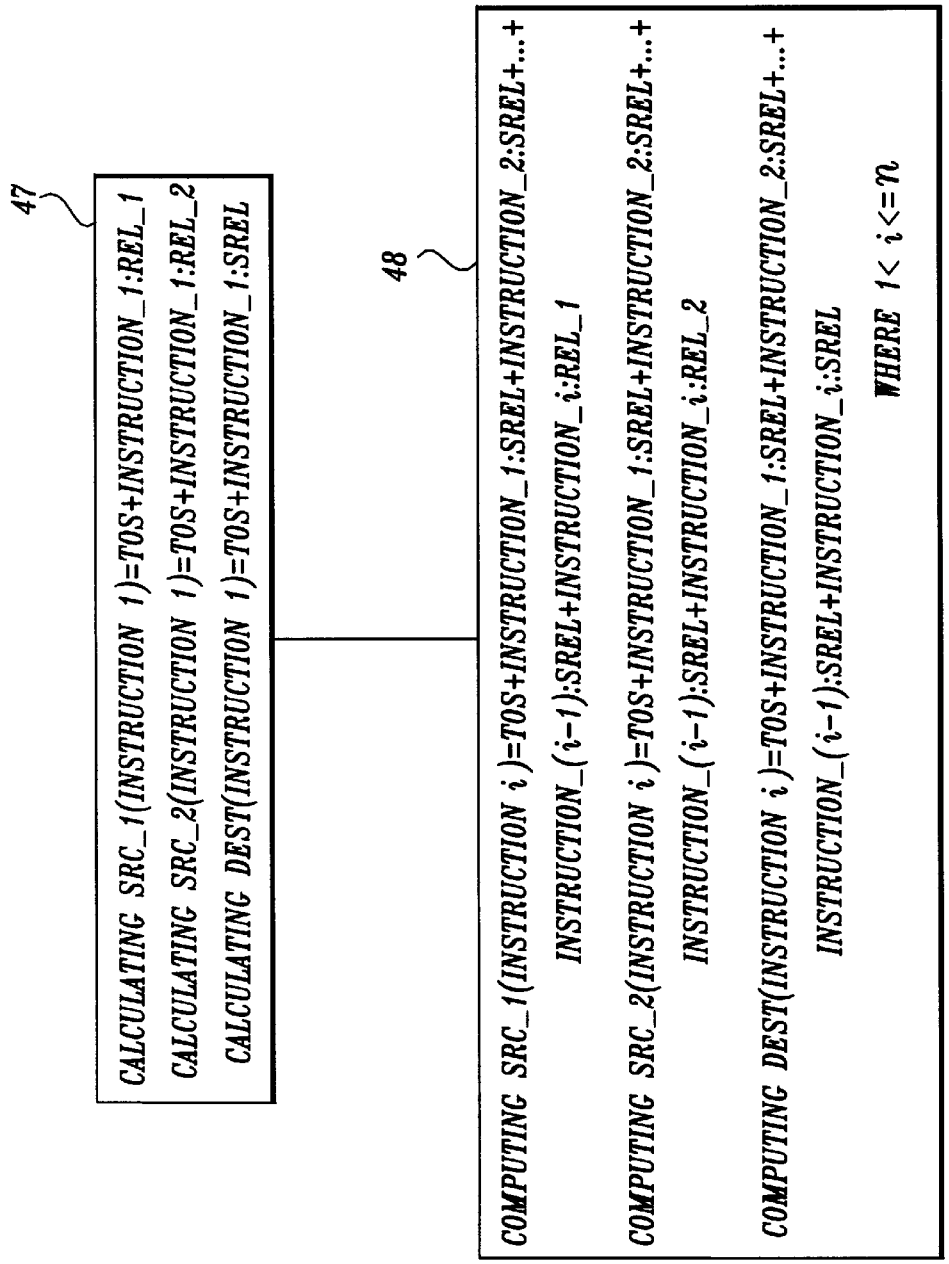
FIG. 4b is a flowgraph of the first embodiment of the stack renamer in the parallel structure that executes instructions in parallel.

Referring now to FIG. 4b, there is shown a flowgraph of the first embodiment of the stack renamer in the parallel structure that computes instructions in parallel. At a step 47, the stack renamer 14 calculates three values at the instruction 1: a source 1 denoting the physical register location of an operand 1, a source 2 denoting the physical register location of an operand 2, and a destination for the instruction 1. The source 1 of the instruction 1 is calculated by summing the TOS and the relative location 1 in the instruction 1, represented by the equation SRC_1 (instruction 1)=TOS+instruction_1:Rel_1. The source 2 of the instruction 1 is calculated as the summation of the TOS and the relative location 2 in the instruction 1, represented by the equation SRC_2 (instruction 1)=TOS+instruction_1:Rel_2. The destination of the instruction 1 is calculated by summing of the TOS and the relative location of the stack, represented by the equation DEST (instruction 1)=TOS+instruction_1:Srel.

At a step 48, if there are n instructions that require renaming concurrently, the stack renamer 14 computes three values at an instruction i: a source 1 denoting the physical register location of the operand 1 for the instruction i, a source 2 denoting the physical register location of the operand 2 for the instruction i, and a destination for the instruction i, where the symbol i contains the parameter: 1<i≦n for n instructions. The source 1 of the instruction i is computed by summing the TOS and the stack relative location of the instruction 1, the stack relative location of the instruction 2, the stack relative location of intermediate instructions, the stack relative location of the instruction i−1, and a first relative location of the instruction i, represented by the equation: SRC_1 (instruction i)=TOS+instruction_1:Srel+instruction_2:Srel+ . . . +instruction_$_{(i-1)}$: Srel+ instruction_i: Rel_1. The source 2 of the instruction i is computed as the summation of the TOS, the stack relative location of the instruction 1, the stack relative location of the instruction 2, the stack relative location of intermediate instructions, the stack relative location of the instruction i−1, and a second relative location of the instruction i, represented by the equation: SRC_2 (instruction i)=TOS+ instruction_1:Srel:+instruction_2:Srel+ . . . +instruction_ (i−1): Srel+instruction_i: Rel_2. The destination of the instruction i is computed by summing the TOS and the stack relative location of the instruction 1, the stack relative location of the instruction 2, the stack relative location of intermediate instructions, the stack relative location of the instruction i−1, and the stack relative location of the instruction i, represented by the equation: DEST (instruction i)=TOS+instruction_1:Srel+instruction_2:Srel+ . . . +instruction_(i−1): Srel+instruction_i: Srel. The steps 47 and 48 are performed in parallel which produce the best performance in terms of the computing time, but cost more to implement this design due to the complex adders required for the parallel processing of instructions.

Figure 5A:
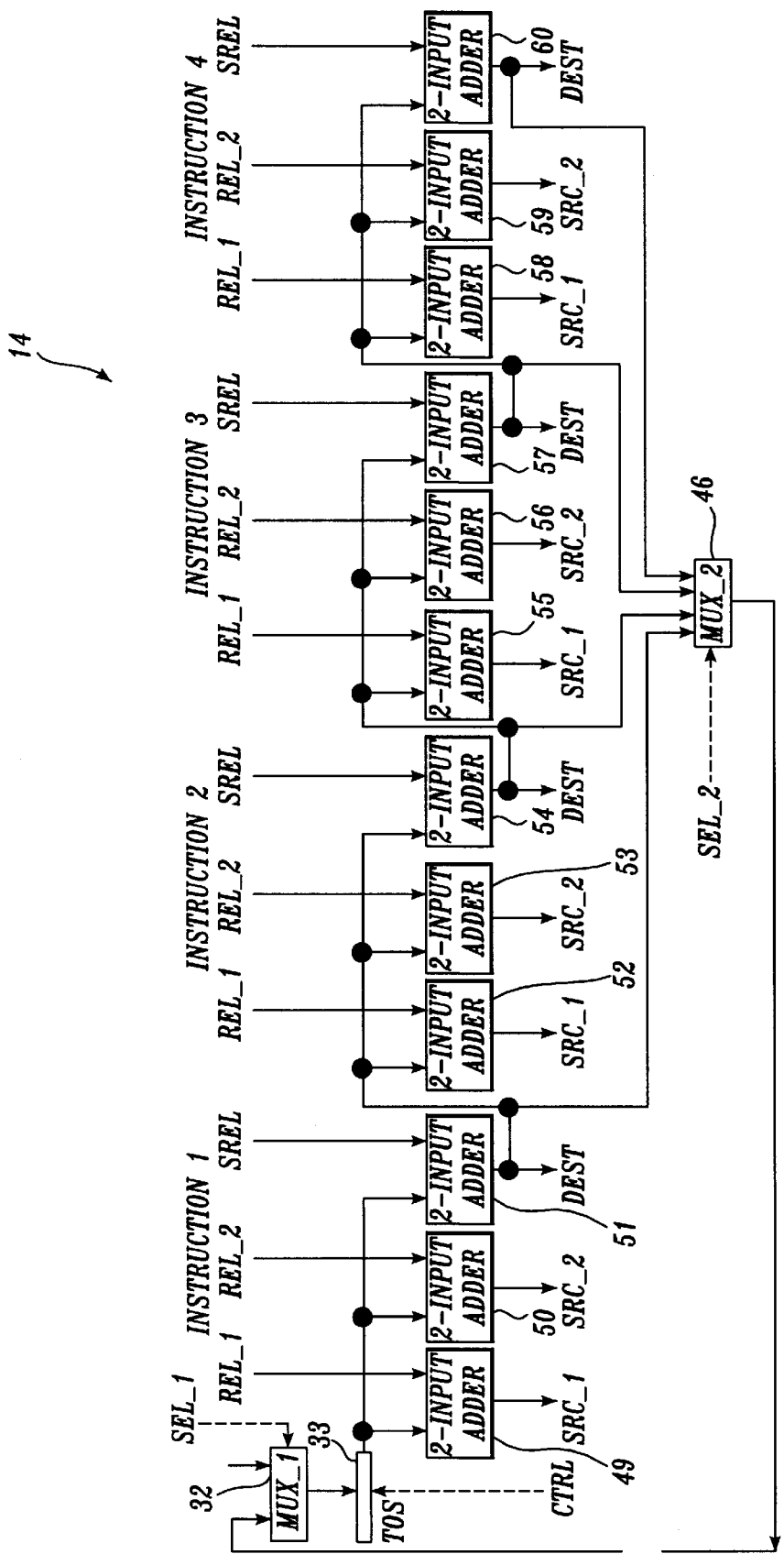
FIG. 5a is a schematic diagram of the second embodiment of a stack renamer in a serial structure that executes instructions serially.

FIG. 5a is a schematic diagram of the second embodiment of a stack renamer 14 in a serial structure that computes instructions serially. The stack renamer 14 includes the mux 32, the TOS register 33, a first set of 2-input adders 49, 50, 51, a second set of 2-input adders 52, 53, 54, a third set of 2-input adders 55, 56, 57, a fourth set of 2-input adders 58, 59, 60, and the mux 46. The first set of 2-input adders 49, 50, and 51 corresponds with the execution of an instruction 1. The second set of 2-input adders 52, 53, and 54 corresponds with the execution of an instruction 2. The third set of 2-input adders 55, 56, and 57 corresponds with the execution of an instruction 3. The fourth set of 2-input adders 58, 59, and 60 corresponds with the execution of an instruction 4. In the serial structure of stack renaming, the computation of a preceding instruction is required before the subsequent instruction can be executed. Thus, the renaming of the instruction 2 must wait until the instruction 1 has been renamed; the renaming of the instruction 3 must wait until the instruction 2 has been renamed; the renaming of the instruction 4 must wait until the instruction 3 has been renamed. To phrase in another way, in the serial structure of the stack renamer 14, the DEST from the instruction 1 serves as the TOS to the instruction 2 by connecting the DEST of the instruction 1 to the input of the 2-input adders 52, 53, and 54. The DEST from the instruction 2 operates as the TOS to the instruction 3 by connecting the DEST from the instruction 2 to the input of the 2-input adders 55, 56, and 57. The DEST from the instruction 3 serves the TOS to the instruction 4 by connecting the DEST from the instruction 3 to the input of the 2-input adders 58, 59, and 60. The mux 46 selects the desirable input among the DEST from instructions 1, 2, 3, or 4 and store the selected DEST into the TOS register 33. As a result, the time delay in a serial structure is long compare to the parallel structure because each instruction is executed serially and the execution of a subsequent instruction is dependent on the completion of the execution of the preceding instruction. Conversely, three 2-input adders are required for each instruction to implement the stack renaming, and thus the hardware cost in the design of a serial structure is less given that each of the adders require only two inputs in comparison to the parallel structure which requires 3-input, 4-input, and 5-input adders.

Figure 5B:
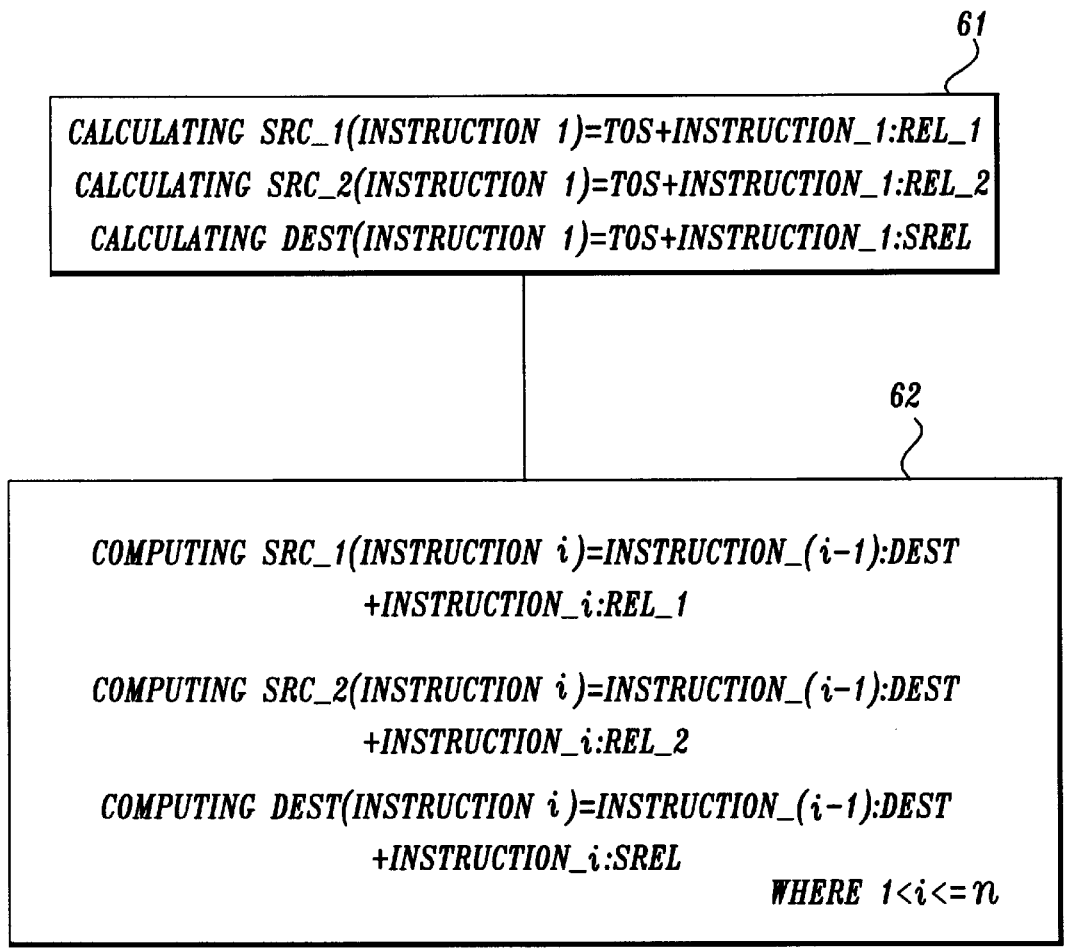
FIG. 5b is a flowgraph of the second embodiment of a stack renamer in a serial structure that executes instructions serially.

FIG. 5b is a flowgraph of the second embodiment of a stack renamer in a serial structure that computes instructions serially. At a step 61, the stack renamer 14 calculates the three values in the instruction 1: a source 1, a source 2, and a destination. The source 1 of the instruction 1 is calculated by summing the TOS and the relative location 1 in the instruction 1, represented by the equation SRC__1 (instruction 1)=TOS+instruction__1:Rel__1. The source 2 of the instruction 1 is calculated as the summation of TOS and the relative location 2 in the instruction 1, represented by the equation SRC__2 (instruction 1)=TOS+instruction__1:Rel__2. The destination of the instruction 1 is calculated by summing the TOS and the relative location of the stack, represented by the equation DEST (instruction 1)=TOS+instruction__1:Srel. At a step 62, assuming there are n instructions, the stack renamer 14 computes three values at instruction i, a source 1, a source 2, a destination, where 1<i≦n. The source 1 of the instruction i is computed by summing the destination at the instruction i−1, and the relative location 1 at the instruction i, represented by the equation: SRC__1 (instruction i)=instruction__(i−1): DEST+instruction__i: Rel__1. The source 2 of the instruction i is computed by summing the destination at the instruction i−1 and the relative location 2 at the instruction i, represented by the equation: SRC__2 (instruction i) instruction__(i−1): DEST+instruction__i: Rel__2. The destination of the instruction i is computed as the summation of the destination at the instruction i−1 and the stack relative location of the instruction i, represented by the equation: DEST (instruction i)=instruction__(i−1): DEST+instruction__i: Srel. In the step 62, the SRC__1, SRC__2, and DEST of the instruction i is not computed until the DEST of the instruction i−1 becomes available.

Figure 6A:
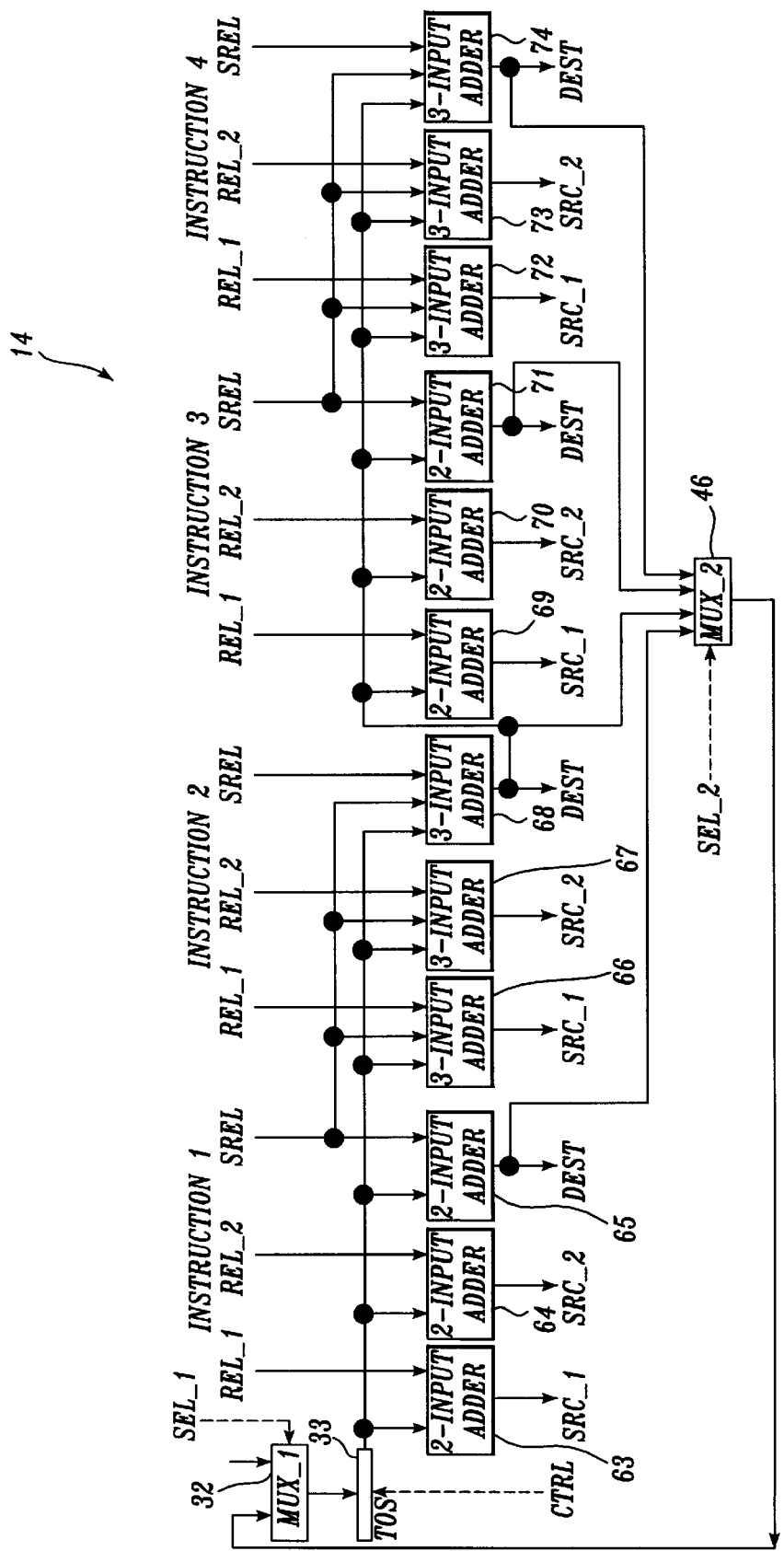
FIG. 6a is a schematic diagram of the third embodiment of a stack renamer in a parallel-serial structure that executes the instructions partially in parallel and partially in serial.

FIG. 6a is a schematic diagram of the third embodiment of a stack renamer in a parallel-serial structure that computes the instructions partially in parallel and the instructions partially in serial. The stack renamer 14 includes the mux 32, the TOS register 33, a plurality of 2-input adders 63, 64, 65, a plurality of 3-input adders 66, 67, 68, a plurality of 2-input adders 69, 70, 71, a plurality of 3-input adders 72, 73, 74, and the mux 46. The plurality of 2-input adders 63, 64, and 65 correspond with the execution of an instruction 1. The plurality of 3-input adders 66, 67, and 68 correspond with the execution of an instruction 2. The execution of the instructions 1 and 2 are computed in parallel. The plurality of 2-input adders 69, 70, and 71 correspond with the execution of the an instruction 3. The plurality of 3-input adders 72, 73, and 74 correspond with the execution of an instruction 4. The execution of the instruction 3 and 4 are computed in parallel. However, the computation sequence between the instructions 1 and 2 is serially connected to the instructions 3 and 4. Thus, the renaming of the instructions 3 and 4 must wait until the completion of the renaming of the instruction 2.

In the parallel-serial structure, the Srel from the instruction 1 is connected to the input of The 3-input adders 66, 67 and 68 of the instruction 2. The DEST from the instruction 2 represents the location of the new TOS for instructions 3 and 4. The DEST from the instruction 2 is connected to the input of the 2-input adders 69, 70, and 71 of the instruction 3 and is further connected to the input of the 3-input adders 72, 73, and 74 of the instruction 4. In the parallel-serial structure, the critical path is shorter comparing to the serial structure. The critical path for the parallel-serial structure propagates through the 3-input adder 68 of the instruction 2 and one of the 3-input adders 72, 73, and 74 of the instruction 4. In the serial structure embodiment, the critical path propagates through the 2-input adder 51 of the instruction 1, the 2-input adder 54 of the instruction 2, the 2-input adder 57 of the instruction 3, and one of the 2-input adders 58, 59, and 60 of the instruction 4.

In FIG. 6b, there is shown a flowgraph of the third embodiment of a stack renamer in the parallel-serial structure. The symbol n denotes an instruction set that is re-named concurrently. The symbol m denotes a sub-instruction set of the n instruction set. The symbol m is a number greater than 1 and is a factor of the symbol n. Every m sub-instruction set is renamed in parallel within themselves, but each m sub-instruction set is renamed serially in conjunction with other m sub-instruction sets. At a step 75, the stack renamer 14 computes three values at the instruction 1 of the m sub-instruction set, a source 1, a source 2, and a destination. The source 1 of the instruction 1 is calculated by summing the TOS and the relative location 1 in the instruction 1, represented by the equation SRC__1 (instruction 1)=TOS+instruction1:Rel__1. The source 2 of the instruction 1 is calculated as the summation of TOS and the relative location 2 in the instruction 1, represented by the equation SRC__2 (instruction 1)=TOS+instruction__1:Rel__2. The destination of the instruction 1 is calculated by summing the TOS and the relative location of the stack, represented by the equation DEST (instruction 1)=TOS+instruction__1:Srel.

At a step 76, the stack renamer 14 computes the source 1 denoting a physical register location of the operand 1 from the instruction i, the source 2, if required, denoting a physical register location of the operand 2 for the instruction i, and destination for the instruction i, where 1<i≦m. The bit width of Rel__1, Rel__2, and Srel is dependent on a selected instruction set. For example, the selected instruction may have a value of −1 or −2, which would require 2's complement to implement the instruction and thus requires 3 bits. The source 1 of the instruction i is calculated by summing the TOS, the stack relative location of the instruction 1, the stack relative location of the instruction 2, the stack relative locations of any intermediate instructions, the stack relative location of the instruction i−1, and the first relative location of the instruction i, represented by the equation: SRC__1 (instruction i)=TOS+instruction__1:Srel+instruction__2:Srel+ . . . +instruction__(i−1): Srel+instruction__i: Rel__1. The source 2 of the instruction i is calculated as the summation of the TOS, the stack relative location of the instruction 1, the stack relative location of the instruction 2, the stack relative locations of any intermediate instructions, the stack relative location of the instruction i−1, and the second relative location of the instruction i, represented by the equation: SRC_2 (instruction i)=TOS+instruction_1:Srel+instruction_2:Srel+ . . . +instruction_(i−1): Srel+instruction_i: Rel_2. The destination of the instruction i is calculated by summing the TOS, the stack relative location of the instruction 1, the stack relative location of the instruction 2, the stack relative locations of any intermediate instructions, the stack relative location of the instruction i−1, and the stack relative location of the instruction i, represented by the equation: DEST (instruction i)=TOS+instruction_1:Srel+instruction_2:Srel+ . . . +instruction_(i−1): Srel +instruction_i: Srel. The steps 75 and 76 are performed in parallel.

At a step 77, the stack renamer 14 computes a source 1, a source 2, and a destination for an m+1 instruction. The source 1 of the instruction m+1 is computed by summing the destination of the instruction m and the first relative location of the instruction m+1, represented by the equation: SRC_1 (instruction m+1)=instruction_m:DEST+instruction_(m+1): Rel_1. The source 2 of the instruction m+1 is computed as the summation of the destination of the instruction m and the second relative location of the instruction m+1, represented by the equation: SRC_2 (instruction m+1)= instruction_m:DEST+instruction_(m+1): Rel_2. The destination of the m+1 instruction is computed by summing the destination of the instruction m and the stack relative location of the instruction m+1, represented by the equation: DEST (instruction m+1)=instruction_m:DEST+ instruction_(m+1):Srel.

At a step 78, the stack renamer 14 computes a source 1, a source 2, and a destination for a j instruction, where m+1<j≦2 m. The source 1 of the j instruction is computed by summing the destination of the instruction m, the stack relative location of the instruction m+1, the stack relative location of the instruction m+2, stack relative locations of any intermediate instructions, the stack relative location of the instruction j−1, and the first relative location of the instruction j, represented by the equation: SRC_1 (instruction j)=instruction_m:DEST+instruction_(m+1):Srel +instruction_(m+2):Srel+ . . . +instruction_(j−1):Srel+instruction1j:Rel_1. The source 2 of the j instruction is computed as the summation of the destination of the instruction_m, the stack relative location of the instruction m+1, the stack relative location of the instruction m+2, stack relative locations of any intermediate instructions, the stack relative location of the instruction j−1, and the second relative location of the instruction j, represented by the equation: SRC_2 (instruction j)=instruction_m:DEST+ instruction_(m+1):Srel+instruction_(m+2):Srel+ . . . +instruction_(j−1):Srel+instruction_j:Rel_2. The destination of the j instruction is computed as the summation of the destination of the instruction_m, the stack relative location of the instruction m+1, the stack relative location of the instruction m+2, stack relative locations of any intermediate instructions, the stack relative location of the instruction j−1, and the stack relative location of the instruction j, represented by the equation: DEST (instructionj)=instruction_m:DEST+instruction_(m+1):Srel +instruction (m+2):Srel+ . . . +instruction_(j−1):Srel+instruction_j: Srel. Steps 77 and 78 are performed in parallel. However, the steps 75 and 76 operate as a first group while steps 77 and 78 operate as a second group, where the first group is processed serially in relation to the second group. Lastly, at a step 79, the stack renamer 14 computes additional instructions above 2 m, from 2 m+1 up to n instructions, where the third, fourth, fifth, etc. groups can be similarly constructed as groups 1 and 2 as described above.

A first example illustrates a set of selected instructions that initially set the TOS at a physical register location 3. The stack renamer 14 processes the selected instruction concurrently within a cycle 1. The selected instruction set contains four instructions: "pop", "add", "push 420", and "jsr routine". A first instruction "pop" has corresponding relative register locations designated as Rel_1/Rel_2/Srel=0/x/−1, and physical register locations designated as SRC_1/SRC_2/DEST =3/x/2. A second instruction "add" is assigned with relative register locations of Rel_1/Rel_2/Srel=−1/0/−1 and further assigned with physical register locations of SRC_1/SRC_2/DEST=1/2/1. A third instruction "push 420" has corresponding relative register locations designated as Rel_1/Rel_2/Srel=x/x/1 and physical register locations designated as SRC_1/SRC_2/DEST=x/x/2. A fourth instruction "jsr routine" is assigned with relative register locations as Rel_1/Rel_2/Srel=x/x/1 and further assigned with physical register locations as SRC_1/SRC_2/DEST=x/x/3. The stack renamer 14 processes the four instructions concurrently and uses the stack top location associated with a preceding instruction to compute the physical register locations for an operand or operands associated with a particular instruction. After the instructions have been renamed, the stack renamer 14 transfers the renamed instructions to the operand reader and ROB logger 15 and the instruction window 18. The instruction window 18 sends the instructions to one of the functional units 19a, 19b, and 19c for parallel execution of instructions provided, the instructions do not have data dependency between them. In the present example, the first instruction "pop" simply adjusts the location of a stack pointer and does not modify any element in a stack. Thus, the first instruction "pop" can be executed in parallel and in conjunction with other instructions by one of the functional units. The other three instructions, "add", "push 420", and "jsr routine" also do not impose any data dependency among themselves, and thus are also permitted to be executed in parallel with other instructions as well.

In a cycle 2, a second set of instructions are decoded and renamed, with the TOS initially set at a physical register location 3. The second set of instructions comprises "push 10", "add", "goto loop1", and "not". The first instruction "push 10" has corresponding relative register locations designated as Rel_1/Rel_2/Srel=x/x/1, and physical register locations designated as SRC_1/SRC_2/DEST=x/x/4. The second instruction "add" is assigned with relative register locations of Rel_1/Rel_2/Srel=−1/0/−1 and further assigned with physical register locations of SRC_1/SRC_2/DEST=3/4/3. The third instruction "goto loop1" has corresponding relative register locations designated as Rel_1/Rel_2/Srel=x/x/0 and physical register locations as SRC_1/SRC_2/DEST=x/x/3. The fourth instruction "not" is assigned with relative register locations of Rel_1/Rel_2/Srel=0/x/0 and further assigned with physical register locations of SRC_1/SRC_2/DEST=3/x/3. Again, the stack renamer 14 processes the second set of instructions concurrently within the cycle 2. At the instruction window 18, since the "push 10" instruction does not impose any data dependency with the other instructions in the cycle 1, the instruction window 18 may transfer the "push 10" instruction to one of the functional units 19a, 19b, and 19c for parallel execution with the four instructions from the first instruction set. However, the "add" instruction in the cycle 2 must wait until the execution of the "push 10" instruction is completed because the "add" instruction has data dependency with the "push 10" instruction. The "goto loop1" instruction does not modify any element in a stack and thus, the instruction window 18 may transfer this instruction to one of the functional units 19a, 19b, and 19c for parallel execution with respect to the other instructions in the second instruction set. The "goto loop1" instruction does change the program execution flow such that a suitable value of the TOS will be determined and stored into the TOS register 33. The most recent TOS may be generated from the DEST of the instruction "goto" or from the DEST of the instruction of "not", depending on a branch control mechanism implemented in the processor. Also, if a branch prediction mechanism is used in the processor, the most recent TOS is likely to come from the DEST of the "goto" instruction after the "goto" instruction has been renamed; otherwise the most recent TOS is likely to come from the DEST of the instruction "not" after the instruction "not" has been renamed.

A second example illustrates the processing and execution of another set of selected instructions, with the initial TOS set at a location 10. The selected instruction set includes "push 800", "fetch", "add" and "invalid" instructions. The first instruction "push 800" has corresponding relative register locations designated as Rel_1/Rel_2/Srel=x/x/1, and physical register locations designated as SRC_1/SRC_2/DEST=x/x/11. The second instruction "fetch" is assigned with relative register locations of Rel_1/Rel_2/Srel=0/x/0 and further assigned with physical register locations of SRC_1/SRC_2/DEST=11/x/11. The third instruction "add" has corresponding relative register locations designated as Rel_1/Rel_2/Srel=-1/0/-1 and physical register locations designated as SRC_1/SRC_2/DEST =10/11/10. The fourth instruction is an "invalid" instruction. The stack renamer 14 processes the four instructions concurrently and uses the stack top location associated with a preceding instruction to compute the physical register location for an operand or operands associated with a particular instruction. The stack renamer 14 transfers the renamed instructions to one of the functional units 19a, 19b, and 19c for possible parallel execution of instructions, provided the instructions do not have data dependency between them. In this example, however, the first, second, and third instructions have data dependency among themselves, and thus are not eligible for parallel execution by one of the functional units 19a, 19b, and 19c. Each of the first, second, and third instructions are executed serially by one of the functional units 19a, 19b, and 19 c. At the conclusion of processing the first instruction set, the most recent TOS is obtained after renaming the "add" instruction or the third instruction, which has the TOS set at the physical register location 10.

In a cycle 2 in the example 2, a second set of instructions are decoded by the decoder 13 and renamed by the stack renamer 14. The second set of instructions comprises of "store", "dup", "not", and "ifeq". The first instruction "store" has corresponding relative register locations designated as Rel_1/Rel_2/Srel=-1/0/-2, and physical register locations designated as SRC_1/SRC_2/DEST=9/10/8. The second instruction "dup" is assigned with relative register locations of Rel_1/Rel_2/Srel=0/x/1 and further assigned physical register locations as SRC_1/SRC_2/DEST=8/x/9. The third instruction "not" has corresponding relative register locations designated as Rel_1/Rel_2/Srel=0/x/0 and physical register locations designated as SRC_1/SRC_2/DEST=9/x/9. The fourth instruction "ifeq" is assigned with relative register locations of Rel_1/Rel_2/Srel=0/x/-1 and further assigned physical register locations of SRC_1/SRC_2/DEST 9/x/8. The stack renamer 14 processes the four instructions in the second instruction set concurrently. However, at the instruction window 18, each of the four instructions of the second instruction set has data dependency among themselves, and thus are not eligible for parallel execution by one of the functional units 19a, 19b, and 19 c. Thus, the instruction window 18 transfers the first, second, third, and fourth instructions to one of the functional units 19a, 19b, and 19c for serial execution. The two examples illustrated above are applicable to all three embodiments which implement the stack renamer in a parallel, serial, and parallel-serial methods and architectures.

Although specific embodiments have been illustrated and described, it will be obvious to those skilled in the art that various modifications may be made without departing from the spirit which is intended to be limited solely by the appended claims. For example, there can be more than four instructions, such as six or eight instructions, computed serially in a serial structure, in parallel in a parallel structure, or partially in parallel and partially serially in a parallel-serial structure. Each of the instructions may also contain one, two, three, four, or more operands. Although the TOS is assumed to point to the stack top element, alternate designations can be used to represent the TOS differently, such as the TOS may be designated to point to an empty location adjacent to the stack top element such that the relative locations for operands and the stack top locations are subtracted by one. Furthermore, the cascading of the serial and parallel structures can be implemented with various modifications, such as a serial-parallel-serial, a parallel-serial-parallel, or a parallel-serial-parallel-serial structure. Thus, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for renaming stacks in a parallel structure, comprising the steps of:

decoding a first instruction to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

renaming the first instruction from the first relative register location to a first physical register location, from the second relative register location to a second physical register location, and from the first stack relative pointer to a third physical register location, the first undetermined stack top location being set to a stack top location;

decoding a second instruction to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and renaming the second instruction from the third relative register location to a fourth physical register location, from the fourth relative register location to a fifth physical register location, from the second stack relative pointer to a sixth physical register location, the second undetermined stack top location being set to the same value as the third physical register location.

2. The method of claim 1 further comprising the steps of:

decoding an $n^{th}$ instruction to provide a $2n-1$ relative register location of a first operand of the $n^{th}$ instruction, a 2n relative register location of a second operand of the $n^{th}$ instruction, and an $n^{th}$ stack relative pointer; and renaming the $n^{th}$ instruction from the 2n−1 relative register location to a 3n−2 physical register location, from the 2n relative register location to a 3n−1 physical register location, from the $n^{th}$ stack relative pointer to a 3n physical register location.

3. The method of claim 1 wherein the renaming step of the first instruction comprises determining the first physical register location by summing the stack top location and the first relative register location.

4. The method of claim 1 wherein the renaming step of the first instruction comprises determining the second physical register location by summing the stack top location and the second relative register location.

5. The method of claim 1 wherein the renaming step of the first instruction comprises determining the third physical register location being determined by summing the stack top location and the first stack relative pointer.

6. The method of claim 1 wherein the renaming step of the second instruction comprises determining the fourth physical register location by summing the stack top location, the first stack relative pointer, and the third relative register location.

7. The method of claim 1 wherein the renaming step of the second instruction comprises determining the fifth physical register location by summing the stack stop location, the first stack relative pointer, and the fourth relative register location.

8. The method of claim 1 wherein the renaming step of the second instruction comprises determining the sixth physical register location by summing the stack top location, the first stack relative pointer, and the second stack relative pointer.

9. The method of claim 1 wherein the renaming step of the first instruction comprises the steps of: reading a first operand and a second operand of the first instruction; and processing the first operand and the second operand of the first instruction to the third physical register.

10. The method of claim 1 wherein the renaming step of the first instruction comprises the steps of: reading the first operand of the first instruction; and processing the first operand to the third physical register.

11. The method of claim 1 wherein the renaming step of the first instruction comprises the steps of: reading the second operand of the first instruction; and processing the second operand to the third physical register.

12. The method of claim 1 wherein the renaming step of the first instruction comprises processing no operand to the third physical register.

13. The method of claim 1 wherein the renaming step of the second instruction comprising the steps of: reading the first and second operands of the second instruction; and processing the first and second operands of the second instruction to the sixth physical register.

14. The method of claim 1 wherein the renaming step of the second instruction comprising the steps of: reading the first operand of the second instruction; and processing the first operand of the second instruction to the sixth physical register.

15. The method of claim 1 wherein the renaming step of the second instruction comprising the steps of: reading the second operand of the second instruction; and processing the second operand of the second instruction to the sixth physical register.

16. The method of claim 1 wherein the renaming step of the second instruction comprising processing no operand to the sixth physical register.

17. A stack renamer in a parallel structure, comprising:

a first decoder for decoding a first instruction to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

a first stack renamer for renaming the first instruction from the first relative register location to a first physical register location, from the second relative register location to a second physical register location, and from the first stack relative pointer to a third physical register location, the first undetermined stack top location being set to a stack top location;

a second decoder for decoding a second instruction to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and a second stack renamer coupled in parallel to the first stack renamer of the first instruction for renaming the second instruction from the third relative register location to a fourth physical register location, from the fourth relative register location to a fifth physical register location, from the second stack relative pointer to a sixth physical register location, the second undetermined stack top location being set to the same value as the third physical register location.

18. The stack renamer of claim 17, wherein the first stack renamer comprises:

a first adder having a first input for receiving the stack top location, a second input for receiving the first relative register location, and an output for renaming the first relative register location to the first physical register location by summing the stack top location and the first relative register location;

a second adder having a first input for receiving the stack top location, a second input for receiving the second relative register location, and an output for renaming from the second relative register location to the second physical register location by summing the stack top location and the second relative register location; and a third adder having a first input for receiving the stack top location, a second input for receiving the first stack relative pointer, and an output for renaming from the first stack relative pointer to the third physical register location by summing the stack top location and the first stack relative pointer.

19. The stack renamer of claim 17, wherein the second stack renamer comprises:

a fourth adder having a first input for receiving the stack top location, a second input for receiving the first stack relative pointer, a third input for receiving the third relative register location, and an output for renaming the third relative register location to the fourth physical register location by summing the stack top location, the first stack relative pointer, and the third relative register location;

a fifth adder having a first input for receiving the stack top location, a second input for receiving the first stack pointer, a third input for receiving the fourth relative register location, and an output for renaming from the fourth relative register location to the fifth physical register location by summing the stack top location, the first stack relative pointer, and the fourth relative register location; and a sixth adder having a first input for receiving the stack top location, a second input for receiving the first stack relative pointer, a third input for receiving the second stack relative pointer, and an output for renaming from the second stack relative pointer to the sixth physical register location by summing the stack top location, the first stack relative pointer, and the second stack relative pointer.

20. The stack renamer of claim 17 further comprising:

a (3n−2) adder having a first input for receiving the stack top location, a second input for receiving the first stack relative pointer, a third input for receiving the second stack relative pointer, ..., an $n^{th}$ input for receiving the (n−1) stack relative pointer, and an (n+1) input for receiving a (2n−1) relative register location of the first operand of an $n^{th}$ instruction, and an output for renaming the (2n−1) relative register location to a (3n−2) physical register location;

a (3n−1) adder having a first input for receiving the stack top location, a second input for receiving the first stack relative pointer, a third input for receiving the second stack relative pointer, ..., an $n^{th}$ input for receiving the (n−1) stack relative pointer, and an (n+1) input for receiving a 2n relative register location of the second operand of the $n^{th}$ instruction, and an output for renaming the 2n relative register location to a (3n−1) physical register location; and a 3n adder having a first input for receiving the stack top location, a second input for receiving the first stack relative pointer, a third input for receiving the second stack relative pointer, ..., an $n^{th}$ input for receiving the (n−1) stack relative pointer, and an (n+1) input for receiving an $n^{th}$ stack relative pointer of the $n^{th}$ instruction, and an output for renaming the $n^{th}$ stack relative pointer to a 3n physical register location.

21. The stack renamer of claim 20 further comprising a decoder for decoding the $n^{th}$ instruction to produce the (2n−1) relative register location of the first operand of the $n^{th}$ instruction.

22. The stack renamer of claim 20 further comprising a decoder for decoding the $n^{th}$ instruction to produce the 2n relative register location of the second operand of the $n^{th}$ instruction.

23. The stack renamer of claim 20 further comprising a decoder for decoding the $n^{th}$ instruction to produce the $n^{th}$ stack relative pointer.

24. The stack renamer of claim 20 further comprising a first mux having a first input for receiving the output from the third adder, a second input for receiving the output from the sixth adder, ..., an $n^{th}$ input for receiving the output from the 3n adder and an output.

25. The stack renamer of claim 20 further comprising a second mux having a first input coupled to the output of the first mux, a second input, and an output.

26. The stack renamer of claim 20 further comprising a register having an input coupled to the output of the second mux, and an output coupled to the first input of the first, second, ..., and $3n^{th}$ adders.

27. The stack renamer of claim 20 wherein the bit width of the third, sixth, ..., and 3n physical register locations is as wide as the bit width of the stack top location.

28. A method for renaming stacks in a serial structure, comprising the steps of:

decoding a first instruction to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

renaming the first instruction from the first relative register location to a first physical register location, from the second relative register location to a second physical register location, and from the first stack relative pointer to a third physical register location, the first undetermined stack top location being set to a stack top location;

decoding a second instruction to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and renaming the second instruction serially relative to renaming the first instruction, from the third relative register location to a fourth physical register location, from the fourth relative register location to a fifth physical register location, and from the second stack relative pointer to a sixth physical register location, the second undetermined stack top location being set to the same value as the third physical register location.

29. The method of claim 28 further comprising the steps of:

decoding an $n^{th}$ instruction to provide a $(2n^{th}-1)$ relative register location of a first operand of the $n^{th}$ instruction relative to an $n^{th}$ undetermined stack top location, a $2n^{th}$ relative register location of a second operand of the $n^{th}$ instruction relative to the $n^{th}$ undetermined stack top location, and an $n^{th}$ stack relative pointer relative to the $n^{th}$ undetermined stack top location; and renaming the $n^{th}$ instruction from the $(2n^{th}-1)$ relative register location to a (3n−2) physical register location, from the $2n^{th}$ relative register location to a (3n−1) physical register location, and from and the $n^{th}$ stack relative pointer to a 3n physical register location.

30. The method of claim 28 wherein the renaming step of the first instruction comprises determining the first physical register location by summing the stack top location and the first relative register location.

31. The method of claim 28 wherein the renaming step of the first instruction comprises determining the second physical register location by summing the stack top location and the second relative register location.

32. The method of claim 28 wherein the renaming step of the first instruction comprises determining the third physical register location being determined by summing the stack top location and the first stack relative pointer.

33. The method of claim 28 wherein the renaming step of the second instruction comprises determining the fourth physical register location by summing the third physical register location and the third relative register location.

34. The method of claim 28 wherein the renaming step of the second instruction comprises determining the fifth physical register location by summing the third physical register location and the fourth relative register location.

35. The method of claim 28 wherein the renaming step of the second instruction comprises determining the sixth physical register location by summing the third physical register location and the second stack relative pointer.

36. The method of claim 28 wherein the renaming step of the first instruction comprising steps of: reading the first operand of the first instruction and the second operand of the first instruction; and processing the first and second operands of the first instruction to the third physical register.

37. The method of claim 28 wherein the renaming step of the first instruction comprising the steps of: reading a first operand of the first instruction; and processing the first operand of the first instruction to the third physical register.

38. The method of claim 28 wherein the renaming step of the first instruction comprising the steps of: reading a second operand of the first instruction; and processing the second operand of the first instruction to the third physical register.

39. The method of claim 28 wherein the renaming step of the first instruction comprising the step of processing no operand to the third physical register.

40. The method of claim 28 wherein the renaming step of the second instruction comprising the steps of: reading the first operand of the second instruction and the second operand of the second instruction; and processing the first operand of the second instruction and the second operand of the second instruction to the sixth physical register.

41. The method of claim 28 wherein the renaming step of the second instruction comprising the steps of: reading a first operand of the second instruction; and processing the first operand of the second instruction to the sixth physical register.

42. The method of claim 28 wherein the renaming step of the second instruction comprising the steps of: reading a second operand of the second instruction; and processing the second operand of the second instruction to the sixth physical register.

43. The method of claim 28 wherein the renaming step of the second instruction comprising the step of processing no operand to the sixth physical register.

44. A stack renamer in a serial structure, comprising:
a first decoder for decoding a first instruction to provide a first relative register location of a first operand relative to a first undetermined stack top location, a second relative register location of a second operand relative to the first undetermined stack top location, and a first stack relative pointer relative to the first undetermined stack top location;
a first stack renamer for renaming the first instruction from the first relative register location to a first physical register location, from the second relative register location to a second physical register location, and from the first stack relative pointer to a third physical register location, the first undetermined stack top location being set to a stack top location;
a second decoder for decoding a second instruction to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and
a second stack renamer coupled in series to the first stack renamer of the first instruction for renaming the second instruction serially relative to renaming the first instruction, from the third relative register location to a fourth physical register location, from the fourth relative register location to a fifth physical register location, and from the second stack relative pointer to a sixth physical register location, the second undetermined stack top location being set to the same value as the third physical register location, the second stack renamer processing the second instruction after receiving the third physical register location from the first stack renamer processing the first instruction.

45. The stack renamer in a serial structure of claim 44, wherein the first stack renamer comprises:
a first adder having a first input for receiving the stack top location, a second input for receiving the first relative register location, and an output for renaming the first relative register location to the first physical register location by summing the stack top location and the first relative register location;
a second adder having a first input for receiving the stack top location, a second input for receiving the second relative register location, and an output for renaming from the second relative register location to the second physical register location by summing the first stack top register location and the second relative register location; and
a third adder having a first input for receiving the stack top location, a second input for receiving the first stack relative pointer, and an output for renaming from the first stack relative pointer to the third physical register location by summing the stack top location and the first stack relative pointer.

46. The stack renamer in a serial structure of claim 44, wherein the second stack renamer comprises:
a fourth adder having a first input for receiving the third physical register location, and a second input for receiving the third relative register location, and an output for renaming the third relative register location to the fourth physical register location by summing the third physical register location and the third relative register location;
a fifth adder having a first input for receiving the third physical register location, and a second input for receiving the fourth relative register location, and an output for renaming from the fourth relative register location to the fifth physical register location by summing the third physical register location and the fourth relative register location; and
a sixth adder having a first input for receiving the third physical register location, and a second input for receiving the second relative stack pointer, and an output for renaming from the second relative stack pointer to the sixth physical register location by summing the third physical register location and the second stack relative pointer.

47. The stack renamer of claim 44 further comprising:
a (3n−2) adder having a first input for receiving an output of a (3n−3) adder, and a second input for receiving a (2n−1) relative register location of the first operand of an n instruction, and an output for renaming from the (2n−1) relative register location to a (3n−2) physical register location;
a (3n−1) adder having a first input for receiving an output of the (3n−3) adder, a second input for receiving a 2n relative register location of the second operand of the n instruction, and an output for renaming from the 2n relative register location to a (3n−1) physical register location; and
a 3n adder having a first input for receiving an output of the (3n−3) adder, a second input for receiving an $n^{th}$ stack relative pointer, and an output for renaming the $n^{th}$ stack relative pointer to a 3n physical register location.

48. The stack renamer of claim 47 further comprising a decoder for decoding the $n^{th}$ instruction to produce the ($2n-1$) relative register location of the first operand of the $n^{th}$ instruction.

49. The stack renamer of claim 47 further comprising a decoder for decoding the $n^{th}$ instruction to produce the $2n$ relative register location of the second operand of the $n^{th}$ instruction.

50. The stack renamer of claim 47 further comprising a decoder for decoding the $n^{th}$ instruction to produce the $n^{th}$ stack relative pointer of the $n^{th}$ instruction.

51. The stack renamer of claim 47 wherein the bit width of the third, sixth, . . . , and $3n$ physical register location is as wide as the bit width of the stack top location.

52. The stack renamer of claim 47 further comprising a first mux having a first input for receiving the output from the third adder, a second input for receiving the output from the sixth adder, . . . , an $n^{th}$ input for receiving the output from the $3n$ adder and an output.

53. The stack renamer of claim 47 further comprising a second mux having a first input coupled to the output of the first mux, a second input, and an output.

54. The stack renamer of claim 47 further comprising a register having an input coupled to the output of the second mux, and an output coupled to the first input of the first, second, and third adders.

55. A method for renaming stacks in a parallel-serial structure having a plurality of grouped stack renamers, each grouped stack renamers containing two instructions, the method for renaming a first grouped stack renamer comprising the steps of:

decoding a first instruction to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

renaming the first instruction from the first relative register location to a first physical register location by summing the stack top location and the first relative register location, from the second relative register location to a second physical register location by summing the stack top location and the second relative register location, and from the first stack relative pointer to a third physical register location by summing the stack top location and the first stack relative pointer, the first undetermined stack top location being set to a stack top location;

decoding a second instruction to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and renaming the second instruction from the third relative register location to a fourth physical register location by summing the stack top location, the first stack relative pointer, and the third relative register location, from the fourth relative register location to a fifth physical register location by summing the stack stop location, the first stack relative pointer, and the fourth relative register location, from the second stack relative pointer to a sixth physical register location by summing the stack top location, the first stack relative pointer, and the second stack relative pointer, the second undetermined stack top location being set to the same value as the third physical register location.

56. The method of claim 55 wherein the plurality of grouped stack renamers includes a second grouped stack renamer that is coupled to the first grouped stack renamer, further comprising the steps of:

decoding a third instruction to provide a fifth relative register location of a first operand of the third instruction relative to a third undetermined stack top location, a sixth relative register location of a second operand of the third instruction relative to the third undetermined stack top location, and a third stack relative pointer relative to the third undetermined stack top location;

renaming the third instruction by summing the fifth relative register location and the sixth physical register location to produce a seventh physical register location, by summing the sixth relative register location and the sixth physical register location to produce an eighth physical register location, and by summing the third stack relative pointer and the sixth physical register location to produce a ninth physical register location, the third undetermined stack top location being set to the same value as the sixth physical register location;

decoding a fourth instruction to provide a seventh relative register location of a first operand of the fourth instruction relative to a fourth undetermined stack top location, an eighth relative register location of a second operand of the fourth instruction relative to the fourth undetermined stack top location, and a fourth stack relative pointer relative to the fourth undetermined stack top location; and renaming the fourth instruction by summing the sixth physical register location, the third stack relative pointer, and the seventh relative register location to produce a tenth physical register location, by summing the sixth physical register location, the third stack relative pointer, and the eighth relative register location to produce an eleventh physical register location, by summing the sixth physical register location, the third stack relative pointer, and the fourth stack relative pointer to produce a twelfth physical register location, the fourth undetermined stack top location being set to the same value as the ninth physical register location.

57. The method of claim 56 wherein the plurality of grouped stack renamers includes an $n^{th}$ grouped stack renamer that is coupled in series with an $(n-1)^{th}$ grouped stack renamer, further comprising the steps of:

decoding a ($2n-1$) instruction to provide a ($4n-3$) relative register location of a first operand of the ($2n-1$) instruction relative to a ($2n-1$) undetermined stack top location, a ($4n-2$) relative register location of a second operand of the ($2n-1$) instruction relative to the ($2n-1$) undetermined stack top location, and a ($2n-1$) stack relative pointer relative to the ($2n-1$) undetermined stack top location; and renaming the ($2n-1$) instruction by summing the ($4n-3$) relative register location, and a ($6n-6$) physical register location to produce a ($6n-5$) physical register location, by summing the ($4n-2$) relative register location and the ($6n-6$) physical register location to produce a ($6n-4$) physical register location, and by summing the ($2n-1$) stack relative pointer and the ($6n-6$) physical register location to produce a ($6n-3$) physical register location, the ($2n-1$) undetermined stack top location being set to the same value as the ($6n-6$) physical register location;

decoding a (2n) instruction to provide a (4n−1) relative register location of a first operand of the (2n) instruction relative to a (2n) undetermined stack top location, a (4n) relative register location of a second operand of the (2n) instruction relative to the (2n) undetermined stack top location, and a (2n) stack relative pointer relative to the (2n) undetermined stack top location; and renaming the (2n) instruction by summing the (2n−1) stack relative pointer, the (4n−1) relative register location and the (6n−6) physical register location to produce a (6n−2) physical register location, by summing the (2n−1) stack relative pointer, the (4n) relative register location and the (6n−6) physical register location to produce a (6n−1) physical register location, and by summing the (2n−1) stack relative pointer, the (2n) stack relative pointer and the (6n−6) physical register location to produce a (6n) physical register location, the (2n) undetermined stack top location being set to the same value as the (6n−3) physical register location.

58. The method of claim 55 wherein the renaming step of the first instruction comprises steps of: reading the first operand of the first instruction and a second operand of the first instruction; and processing the first and second operands of the first instruction to the third physical register.

59. The method of claim 55 wherein the renaming step of the first instruction comprises the steps of: reading the first or second operand of the first instruction; and processing the first or second operand of the first instruction to the third physical register.

60. The method of claim 55 wherein the renaming step of the first instruction comprises processing no operand to the third physical register.

61. The method of claim 55 wherein the renaming step of the second instruction comprises the steps of: reading the first operand of the second instruction and the second operand of the second instruction; and processing the first and second operands to the sixth physical register.

62. The method of claim 55 wherein the renaming step of the second instruction comprises the steps of: reading the first or second operand of the first instruction; and processing the first or second operand of the first instruction to the sixth physical register.

63. The method of claim 55 wherein the renaming step of the second instruction comprises processing no operand to the sixth physical register.

64. The method of claim 57 wherein the renaming step of the (2n−1) instruction comprises the steps of: reading the first and second operands of the (2n−1) instruction; and processing the first and second operands to the (6n−3) physical register.

65. The method of claim 57 wherein the renaming step of the (2n−1) instruction comprises the steps of: reading the first or second operand of the (2n−1) instruction; and processing the first or second operand to the (6n−3) physical register.

66. The method of claim 57 wherein the renaming step of the (2n−1) instruction comprises the steps of: reading no operand of the (2n−1) instruction; and processing no operand to the (6n−3) physical register.

67. The method of claim 57 wherein the renaming step of the (2n) instruction comprises the steps of: reading the first and second operands of the (2n) instruction; and processing the first and second operands to the (6n) physical register.

68. The method of claim 57 wherein the renaming step of (2n) instructions comprises the steps of: reading the first or second operand of the (2n) instruction; and processing the first or second operand to the (6n) physical register.

69. The method of claim 57, wherein the renaming step of (2n) instruction comprises the steps of: reading no operand of the (2n) instruction; and processing no operand to the (6n) physical register.

70. A method for renaming stacks in a parallel-serial structure having a plurality of n grouped stack renamers, each grouped stack renamers containing a plurality of m instructions, the method for renaming a first $m_1$-instruction grouped stack renamer comprising the steps of:

decoding a first instruction of the first grouped stack renamer to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

renaming the first instruction of the first grouped stack renamer from the first relative register location to a first physical register location by summing the stack top location and the first relative register location, from the second relative register location to a second physical register location by summing the stack top register location and the second relative register location, and from the first stack relative pointer to a third physical register location by summing the stack top location and the first stack relative pointer, the first undetermined stack top location being set to a stack top location;

decoding a second instruction of the first grouped stack renamer to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and renaming the second instruction of the first grouped stack renamer from the third relative register location to a fourth physical register location by summing the stack top location, the first stack relative pointer, and third relative register location, from the fourth relative register location to a fifth physical register location by summing the first stack stop location, the first stack relative pointer, and the fourth relative register location, from the second stack relative pointer to a sixth physical register location by summing the first stack top pointer, the first stack relative pointer, and the second stack relative pointer, the second undetermined stack top location being set to the same value as the third physical register location.

decoding an $m_1^{th}$ instruction of the first grouped stack renamer to provide a $(2m_1-1)$ relative register location of a first operand of the $m^{th}$ instruction relative to an $m_1^{th}$ undetermined stack top location, a $2m_1$ relative register location of a second operand of the $m^{th}$ instruction relative to the $m_1^{th}$ undetermined stack top location, and an $m_1^{th}$ stack relative pointer relative to the $m_1^{th}$ undetermined stack top location; and renaming the $m_1^{th}$ instruction of the first grouped stack renamer by summing the $(2m_1-1)$ relative register location, the stack top location, the first stack relative pointer, the second stack relative pointer, . . . , and an $(m-1)^{th}$ stack relative pointer, to produce a $(3m_1-2)$ physical register location, by summing the $(2m_1)$ relative register location, the stack top location, the first stack relative pointer, the second stack relative pointer, ..., and the $(m-1)^{th}$ stack relative pointer to produce an $(3m_1-1)$ physical register location, and by summing the $m_1^{th}$ stack relative pointer, the stack top location, the first stack relative pointer, the second stack relative pointer, ..., and the $(m-1)^{th}$ stack relative pointer, to produce a $3m_1$ physical register location, the $m_1^{th}$ undetermined stack top location being set to the same value as an $(3m_1-3)$ physical register location.

71. The method of claim 70 wherein the plurality of grouped stack renamers includes a second $m_2$-instruction grouped stack renamer that is coupled in series to the first $m_1$-instruction grouped stack renamer, further comprising the steps of:

decoding a first instruction of the second grouped stack renamer to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

renaming the first instruction of the second grouped stack renamer by summing the first relative register location and the $3m_1$ physical register location to produce a $(3m_1+1)$ physical register location, by summing the second relative register location and the $3m_1$ physical register location to produce a $(3m_1+2)$ physical register location, and by summing the first stack relative pointer and the $3m_1$ physical register location to produce a $(3m_1+3)$ physical register location, the first undetermined stack top location being set to the same value as the $3m_1$ physical register location;

decoding a second instruction of the second grouped stack renamer to provide a fourth relative register location of a first operand of the second instruction relative to a second undetermined stack top location, a fourth relative register location of a second operand of the second instruction relative to the second undetermined stack top location, and a second stack relative pointer relative to the second undetermined stack top location; and renaming the second instruction of the second grouped stack renamer by summing the $3m_1$ physical register location, the first stack relative pointer, and the third relative register location to produce a $(3m_1+4)$ physical register location, by summing the $3m_1$ physical register location, the first stack relative pointer, and the second relative register location to produce a $(3m_1+5)$ physical register location, by summing the $3m_1$ physical register location, the first stack relative pointer, and the second stack relative pointer to produce to a $(3m_1+6)$ physical register location, the second undetermined stack top location being set to the same value as the $(3m_1+3)$ physical register location;

decoding an $m_2^{th}$ instruction of the second grouped stack renamer to provide a $(2m_2-1)$ relative register location of a first operand of the $m_2^{th}$ instruction relative to an $m_2^{th}$ undetermined stack top location, a $2m_2$ relative register location of a second operand of the $m_2^{th}$ instruction relative to the $m_2^{th}$ undetermined stack top location, and an $m_2^{th}$ stack relative pointer relative to the $m_2^{th}$ undetermined stack top location; and renaming the $m_2^{th}$ instruction of the second grouped stack renamer by summing the $(2m_2-1)$ relative register location, the $(3m_1)$ physical register location, the first stack relative pointer, the second stack relative pointer, ..., and an $(m_2-1)^{th}$ stack relative pointer, to produce a $(3m_1+3m_2-2)$ physical register location, by summing the $(2m_2)$ relative register location, the $(3m_1)$ physical register location, the first stack relative pointer, the second stack relative pointer, ..., and the $(m_2-1)^{th}$ stack relative pointer to produce a $(3m_1+3m_2-1)$ physical register location, and by summing the $m_2^{th}$ stack relative pointer, the $(3m_1)$ physical register location, the first stack relative pointer, the second stack relative pointer, ..., and the $(m_2-1)^{th}$ stack relative pointer to produce a $(3m_1+3m_2)$ physical register location, the $m_2^{th}$ undetermined stack top location being set to the same value as an $(3m_1+3m_2-3)$ physical register location.

72. The method of claim 71 wherein the plurality of grouped stack renamers includes an $n^{th}$ $m_n$-instruction grouped stack renamer that is coupled in series to an $(n-1)^{th}$ grouped stack renamer, further comprising the steps of:

decoding a first instruction of the $n^{th}$ grouped stack renamer to provide a first relative register location of a first operand of the first instruction relative to a first undetermined stack top location, a second relative register location of a second operand of the first instruction relative to the first undetermined stack top location, and a first stack relative pointer relative to the first undetermined stack top location;

renaming the first instruction of the $n^{th}$ grouped stack renamer by summing the first relative register location and a $(3m_1+3m_2+ \ldots +3m_{n-1})^{th}$ physical register location to produce a $(3m_1+3m_2+ \ldots +3m_{n-1}+1)^{th}$ physical register location, by summing the second relative register location and the $(3m_1+3m_2+ \ldots +3m_{n-1})^{th}$ physical register location to produce a $(3m_1+3m_2+ \ldots +3m_{n-1}+2)^{th}$ physical register location, and by summing the first stack relative pointer and the $(3m_1+3m_2+ \ldots +3m_{n-1})^{th}$ physical register location to produce a $(3m_1+3m_2+ \ldots +3m_{n-1}+3)^{th}$ physical register location, the first undetermined stack top location being set to the same value as the $(3m_1+3m_2+ \ldots +3m_{n-1})^{th}$ physical register location;

decoding a second instruction of the $n^{th}$ grouped stack renamer to provide a third relative register location of a first operand of the second instruction relative to a second undetermined stack top location, a fourth relative register location of a second operand of the second instruction relative to the second undetermined stack top location, and a second stack relative pointer relative to the second undetermined stack top location; and renaming the second instruction of the $n^{th}$ grouped stack renamer by summing the $(3m_1+3m_2+ \ldots +3m_{n-1})^{th}$ physical register location, the first stack relative pointer, and the third relative register location to produce a $(3m_1+3m_2+ \ldots +3m_{n-1}+4)^{th}$ physical register location, by summing the $(3m_1+3m_2+ \ldots +3m_{n-1})^{th}$ physical register location, the first stack relative pointer, and the fourth relative register location to produce a $(3m_1+3m_2+ \ldots +3m_{n-1}+5)^{th}$ physical register location, by summing the $(3m_1+3m_2+ \ldots +3m_{n-1})^{th}$ physical register location, the first stack relative pointer, and the second stack relative pointer to produce to a $(3m_1+3m_2+ \ldots +3m_{n-1}+6)^{th}$ physical register location, the second undetermined stack top location being set to the same value as the $(3m_1+3m_2+ \ldots +3m_{n-1}+3)$ physical register location;

decoding an $m_n^{th}$ instruction of the $n^{th}$ grouped stack renamer to provide a $(2m_{n-1})$ relative register location of a first operand of the $m_n^{th}$ instruction relative to an $m_n^{th}$ undetermined stack top location, a $2m_n$ relative register location of a second operand of the $m_n^{th}$ instruction relative to the $m_n^{th}$ undetermined stack top location, and an $m_n^{th}$ stack relative pointer relative to the $m_n^{th}$ undetermined stack top location; and renaming the $m_n^{th}$ instruction of the $n^{th}$ grouped stack renamer by summing the $(2m_n-1)$ relative register location, the $(3m_1+3m_2+ \ldots +3m_{n-1})^{th}$ physical register location, the first stack relative pointer, the second stack relative pointer, . . . , an $(m_n-1)^{th}$ stack relative pointer, to produce a $(3m_1+3m_2+ \ldots +3m_{n-1}+3m_n-2)^{th}$ physical register location, by summing the $(2m_n)$ relative register location, the $(3m_1+3m_2+ \ldots +3m_{n-1})^{th}$ physical register location, the first stack relative pointer, the second stack relative pointer, . . . , and the $(m_n-1)^{th}$ stack relative pointer to produce a $(3m_1+3m_2+ \ldots +3m_{n-1}+3m_n 31\ 1)^{th}$ physical register location, and by summing the $m_n^{th}$ stack relative pointer, the $(3m_1+3m_2+ \ldots +3m_{n-1})^{th}$ physical register location, the first stack relative pointer, the second relative pointer, . . . , the $(m_n-1)^{th}$ stack relative pointer to produce a $(3m_1+3m_2+ \ldots +3m_{n-1}+3m_n)^{th}$ physical register location, the $m_n^{th}$ undetermined stack top location being set to the same value as an $(3m_1+3m_2+ \ldots +3m_{n-1}+3m_n-3)^{th}$ physical register location.

73. The method of claim 70 wherein the renaming step of the first instruction of the first grouped stack renamer comprises steps of: reading the first operand of the first instruction and the second operand of the first instruction; and processing the first and second operands of the first instruction to the third physical register.

74. The method of claim 70 wherein the renaming step of the first instruction of the first grouped stack renamer comprises the steps of: reading the first or second operand of the first instruction; and processing the first or second operand of the first instruction to the third physical register.

75. The method of claim 70 wherein the renaming step of the first instruction of the first grouped stack renamer comprises processing no operand to the third physical register.

76. The method of claim 70 wherein the renaming step of the second instruction of the first grouped stack renamer comprises the steps of: reading the first operand of the second instruction and the second operand of the second instruction; and processing the first and second operands to the sixth physical register.

77. The method of claim 70 wherein the renaming step of the second instruction of the first grouped stack renamer comprises the steps of: reading the first or second operand of the second instruction; and processing the first or second operand of the first instruction to the sixth physical register.

78. The method of claim 70 wherein the renaming step of the second instruction of the first grouped stack renamer comprises processing no operand to the sixth physical register.

79. The method of claim 70 wherein the renaming step of the $m_1^{th}$ instruction of the first grouped stack renamer comprises the steps of: reading the first and second operands of the $m_1^{th}$ instruction; and processing the first and second operands to the $(3m_1)^{th}$ physical register.

80. The method of claim 70 wherein the renaming step of the $m_1^{th}$ instruction of the first grouped stack renamer comprises the steps of: reading the first or second operand of the $m_1^{th}$ instruction; and processing the first or second operand to the $(3m_1)^{th}$ physical register.

81. The method of claim 70 wherein the renaming step of the $m_1^{th}$ instruction of the first grouped stack renamer comprises the steps of: reading no operand of the $m_1^{th}$ instruction; and processing no operand to the $(3m_1)^{th}$ physical register.

82. A stack renamer in a parallel-serial structure having a plurality of grouped stack renamers containing a first grouped stack renamer, the first grouped stack renamer including two instructions, comprising:

a first instruction, comprising:

a first adder having a first input for receiving a stack top location, a second input for receiving a first relative register location of a first operand of the first instruction, and an output for renaming the first relative register location to a first physical register location by summing the stack top location and the first relative register location;

a second adder having a first input for receiving the stack top location, a second input for receiving a second relative register location of a second operand of the first instruction, and an output for renaming from the second relative register location to a second physical register location by summing the stack top location and the second relative register location; and a third adder having a first input for receiving the stack top location, a second input for receiving a first stack relative pointer of the first instruction, and an output for renaming from the first stack relative pointer to a third physical register location by summing the stack top location and the first stack relative pointer;

a second instruction, comprising:

a fourth adder having a first input for receiving the stack top location, a second input for receiving the first stack relative pointer, a third input for receiving a third relative register location of a first operand of the second instruction, and an output for renaming the third relative register location to a fourth physical register location by summing the stack top location, the first stack relative pointer, and the third relative register location;

a fifth adder having a first input for receiving the stack top location, a second input for receiving the first stack relative pointer, a third input for receiving a fourth relative register location of a second operand of the second instruction, and an output for renaming from the fourth relative register location to a fifth physical register location by summing the stack top location, the first stack relative pointer, and the fourth relative register location; and a sixth adder having a first input for receiving the stack top location, a second input for receiving the first stack relative pointer, a third input for receiving a second stack relative pointer of the second instruction, and an output for renaming from the second stack relative location to the sixth physical register location by summing the stack top location, the first stack relative pointer, and the second stack relative pointer.

83. The stack renamer of claim 82 wherein the plurality of grouped stack renamers contains a second grouped stack renamer that is coupled in series with the first grouped stack renamer, the second grouped stack renamer including two instructions, further comprising:

a third instruction, comprising:

a seventh adder having a first input for receiving the sixth physical register location, a second input for receiving a fifth relative register location of a first operand of the third instruction, and an output for renaming the fifth relative register location to a seventh physical register location by summing the sixth physical register location and the fifth relative register location;

an eighth adder having a first input for receiving the sixth physical register location, a second input for receiving a sixth relative register location of a second operand of the third instruction, and an output for renaming from the sixth relative register location to an eighth physical register location by summing the sixth physical register location and the sixth relative register location; and a ninth adder having a first input for receiving the sixth physical register location, a second input for receiving a third stack relative pointer of the third instruction, and an output for renaming from the third stack relative pointer to a ninth physical register location by summing the sixth physical register location and the third stack relative pointer;

a fourth instruction, comprising:

a tenth adder having a first input for receiving the sixth physical register location, a second input for receiving the third stack relative pointer, a third input for receiving a seventh relative register location of a first operand of the fourth instruction, and an output for renaming the seventh relative register location to a tenth physical register location by summing the sixth physical register location, the third stack relative pointer, and the seventh relative register location;

an eleventh adder having a first input for receiving the sixth physical register location, a second input for receiving the third stack relative pointer, a third input for receiving an eighth relative register location of a second operand of the fourth instruction, and an output for renaming from the eighth relative register location to an eleventh physical register location by summing the sixth physical register location, the third stack relative pointer, and the eighth relative register location; and a twelfth adder having a first input for receiving the sixth physical register location, a second input for receiving the third stack relative pointer, a third input for receiving a fourth stack relative pointer of the fourth instruction, and an output for renaming from the fourth stack relative pointer to a twelfth physical register location by summing the sixth physical register location, the third stack relative pointer, and the fourth stack relative pointer.

84. The stack renamer of claim 83 wherein the plurality of grouped stack renamers contain an $n^{th}$ grouped stack renamer that is coupled in series with an $(n-1)^{th}$ grouped stack renamer, the $n^{th}$ grouped stack renamer having two instructions, further comprising:

a $(2n-1)$ instruction, comprising:

a $(6n-5)$ adder having a first input for receiving a $(6n-6)$ physical register location, a second input for receiving a $(4n-3)$ relative register location of a first operand of the $(2n-1)$ instruction, and an output for renaming the $(4n-3)$ relative register location to a $(6n-5)$ physical register location by summing the $(6n-6)$ physical register location and the $(4n-3)$ relative register location;

a $(6n-4)$ adder having a first input for receiving the $(6n-6)$ physical register location, a second input for receiving a $(4n-2)$ relative register location of a second operand of the $(2n-1)$ instruction, and an output for renaming from the $(4n-2)$ relative register location to a $(6n-4)$ physical register location by summing the $(6n-6)$ physical register location and the $(4n-2)$ relative register location; and a $(6n-3)$ adder having a first input for receiving the $(6n-6)$ physical register location, a second input for receiving a $(2n-1)$ stack relative pointer of the $(2n-1)$ instruction, and an output for renaming from the $(2n-1)$ stack relative pointer to a $(6n-3)$ physical register location by summing the $(6n-6)$ physical register location and the $(2n-1)$ stack relative pointer;

a $(2n)$ instruction, comprising:

a $(6n-2)$ adder having a first input for receiving the $(6n-6)$ physical register location, a second input for receiving the $(2n-1)$ stack relative pointer, a third input for receiving a $(4n-1)$ relative register location of a first operand of the $(2n)$ instruction, and an output for renaming the $(4n-1)$ relative register location to a $(6n-2)$ physical register location by summing the $(6n-6)$ physical register location, the $(2n-1)$ stack relative pointer, and the $(4n-1)$ relative register location;

a $(6n-1)$ adder having a first input for receiving the $(6n-6)$ physical register location, a second input for receiving the $(2n-1)$ stack relative pointer, a third input for receiving a $(4n)$ relative register location of a second operand of the $(2n)$ instruction, and an output for renaming the $(4n)$ relative register location to a $(6n-1)$ physical register location by summing the $(6n-6)$ physical register location, the $(2n-1)$ stack relative pointer, and the $(4n)$ relative register location; and a $(6n)$ adder having a first input for receiving the $(6n-6)$ physical register location, a second input for receiving the $(2n-1)$ stack relative pointer, a third input for receiving a $(2n)$ stack relative pointer of the $(2n)$ instruction, and an output for renaming from the $(2n)$ stack relative pointer to a $(6n)$ physical register location by summing the $(6n-6)$ physical register location, the $(2n-1)$ stack relative pointer, and the $(2n)$ stack relative pointer.

85. The stack of claim 83 wherein the bit width of the third, sixth, ninth, twelfth, . . . , $(6n-3)$, and $(6n)$ physical register locations is as wide as the bit width of the stack top location.

86. The method of claim 85 further comprising a first mux having a first input, a second input, an output, and a select signal.

87. The method of claim 86 further comprising a register for storing the stack top location, the register having an input connected to the output of the first mux, a control signal, and an output connected to the first inputs of the first, second, third, fourth, fifth, and sixth adders.

88. The method of claim 87 further comprising a second mux having a plurality of inputs for receiving the third, sixth, ninth, twelfth, . . . , $(6n-3)$, and $(6n)$ physical register locations, an output connected to the first input of the first mux, and a select signal for selecting one of the inputs to be connected to the output.

89. A stack renamer in a parallel-serial structure having a plurality of grouped stack renamers, each grouped stack renamer in the plurality of grouped stack renamers containing at least two instructions, a first $m_1$-instruction grouped stack renamer comprising:

a first instruction, comprising:

a first adder having a first input for receiving a stack top location, a second input for receiving a first relative register location of a first operand of the first instruction, and an output for renaming the first relative register location to a first physical register location by summing the stack top location and the first relative register location;

a second adder having a first input for receiving the stack top location, a second input for receiving a second relative register location of a second operand of the first instruction, and an output for renaming from the second relative register location to a second physical register location by summing the stack top location and the second relative register location; and a third adder having a first input for receiving the stack top location, a second input for receiving a first stack relative pointer of the first instruction, and an output for renaming from the first stack relative pointer to a third physical register location by summing the stack top location and the first stack relative pointer;

a second instruction, comprising:

a fourth adder having a first input for receiving the stack top location, a second input for receiving the first stack relative pointer, a third input for receiving a third relative register location of a first operand of the second instruction, and an output for renaming the third relative register location to a fourth physical register location by summing the stack top location, the first stack relative pointer, and the third relative register location;

a fifth adder having a first input for receiving the stack top location, a second input for receiving the first stack relative pointer, a third input for receiving a fourth relative register location of a second operand of the second instruction, and an output for renaming from the fourth relative register location to a fifth physical register location by summing the stack top location, the first stack relative pointer, and the fourth relative register location;

a sixth adder having a first input for receiving the stack top location, a second input for receiving the first stack relative pointer, a third input for receiving a second stack relative pointer of the second instruction, and an output for renaming from the second stack relative pointer to the sixth physical register location by summing the stack top location, the first stack relative pointer, and the second stack relative pointer;

an $m_1^{th}$ instruction, comprising:

a $(3m_1-2)$ adder having a first input for receiving the stack top location, a second input for receiving the first stack relative pointer, a third input for receiving the second stack relative pointer, . . . , an $m_1^{th}$ input for receiving an $(m_1-1)^{th}$ stack relative pointer of an $(m_1-1)^{th}$ instruction, an $(m_1+1)^{th}$ input for receiving a $(2m_1-1)$ relative register location of a first operand of the $m_1^{th}$ instruction, and an output for renaming from the $(2m_1-1)$ relative register location to a $(3m_1-2)$ physical register location by summing the stack top location, the first and second stack relative pointers, . . . , the $(m_1-1)^{th}$ stack relative pointer, and the $(2m_1-1)$ relative register location;

a $(3m_1-1)$ adder having a first input for receiving the stack top location, a second input for receiving the first stack relative pointer, a third input for receiving the second stack relative pointer, . . . , an $m_1^{th}$ input for receiving the $(m_1-1)^{th}$ stack relative pointer, an $(m_1+1)^{th}$ input for receiving a $(2m_1)$ relative register location of a second operand of the $m_1^{th}$ instruction, and an output for renaming from the $(2m_1)$ relative register location to a $(3m_1-1)$ physical register location by summing the stack top location, the first and second stack relative pointers, . . . , the $(m_1-1)^{th}$ stack relative pointer, and the $(2m_1)$ relative register location; and a $(3m_1)$ adder having a first input for receiving the stack top location, a second input for receiving the first stack relative pointer, a third input for receiving the second stack relative pointer, . . . , an $m_1^{th}$ input for receiving the $(m_1-1)^{th}$ stack relative pointer, an $(m_1+1)^{th}$ input for receiving an $(m_1)^{th}$ stack relative pointer of the $m_1^{th}$ instruction, and an output for renaming from the $m_1^{th}$ stack relative pointer to the $(3m_1)$ physical register location by summing the stack top location, the first and second stack relative pointers, . . . , the $(m_1-1)^{th}$ stack relative pointer, and the $m_1^{th}$ stack relative pointer.

90. A stack renamer of claim 89 wherein the plurality of grouped stack renamers containing a second grouped stack renamer that is coupled in series with the first grouped stack renamer, the second $m_2$-instruction grouped stack renamer comprising:

a first instruction, comprising:

a first adder having a first input for receiving a stack top location, a second input for receiving a first relative register location of a first operand of the first instruction, and an output for renaming the first relative register location to a $(3m_1+1)$ physical register location by summing the stack top location and the first relative register location, the stack top location being set to the same value as the $(3m_1)$ physical register;

a second adder having a first input for receiving the stack top location, a second input for receiving a second relative register location of a second operand of the first instruction, and an output for renaming from the second relative register location to a $(3m_1+2)$ physical register location by summing the stack top location and the second relative register location; and a third adder having a first input for receiving the stack top location, a second input for receiving a first stack relative pointer of the first instruction, and an output for renaming from the first stack relative pointer to a $(3m_1+3)$ physical register location by summing the stack top location and the first stack relative pointer;

a second instruction, comprising:

a fourth adder having a first input for receiving the stack top location, a second input for receiving the first stack relative pointer, a third input for receiving a third relative register location of a first operand of the second instruction, and an output for renaming the third relative register location to a $(3m_1+4)$ physical register location by summing the stack top location, the first stack relative pointer, and the third relative register location;

a fifth adder having a first input for receiving the stack top location, a second input for receiving the first stack relative pointer, a third input for receiving a fourth relative register location of a second operand of the second instruction, and an output for renaming from the fourth relative register location to a $(3m_1+5)$ physical register location by summing the stack top location, the first stack relative pointer, and the fourth relative register location;

a sixth adder having a first input for receiving the stack top location, a second input for receiving the first stack relative pointer, a third input for receiving a second stack relative pointer of the second instruction, and an output for renaming from the second stack relative pointer to a $(3m_1+6)$ physical register location by summing the stack top location, the first stack relative pointer, and the second stack relative pointer;

an $m_2{}^{th}$ instruction, comprising:

a $(3m_2-2)$ adder having a first input for receiving the stack top location, a second input for receiving the first stack relative pointer, a third input for receiving the second stack relative pointer, . . . , an $m_2{}^{th}$ input for receiving an $(m_2-1)^{th}$ stack relative pointer of an $(m_2-1)^{th}$ instruction, an $(m_2+1)^{th}$ input for receiving a $(2m_2-1)$ relative register location of a first operand of the $m_2{}^{th}$ instruction, and an output for renaming from the $(2m_2-1)$ relative register location to a $(3m_2-2)$ physical register location by summing the stack top location, the first and second stack relative pointers, . . . , the $(m_2-1)^{th}$ stack relative pointer, and the $(2m_2-1)$ relative register location;

a $(3m_2-1)$ adder having a first input for receiving the stack top location, a second input for receiving the first stack relative pointer, a third input for receiving the second stack relative pointer, . . . , an $m_2{}^{th}$ input for receiving the $(m_2-1)^{th}$ stack relative pointer, an $(m_2+1)^{th}$ input for receiving a $(2m_2)$ relative register location of a second operand of the $m_2{}^{th}$ instruction, and an output for renaming from the $(2m_2)$ relative register location to a $(3m_2-1)$ physical register location by summing the stack top location, the first and second stack relative pointers, . . . , the $(m_2-1)^{th}$ stack relative pointer, and the $(2m_2)$ relative register location; and a $(3m_2)$ adder having a first input for receiving the stack top location, a second input for receiving the first stack relative pointer, a third input for receiving the second stack relative pointer, . . . , an $m_2{}^{th}$ input for receiving the $(m_2-1)^{th}$ stack relative pointer, an $(m_2+1)^{th}$ input for receiving an $(m_2)^{th}$ stack relative pointer of the $m_2{}^{th}$ instruction, and an output for renaming from the $(m_2)^{th}$ stack relative pointer to a $(3m_2)$ physical register location by summing the stack top location, the first and second stack relative pointers, . . . , and the $(m_2-1)^{th}$ stack relative pointer, and the $m_2{}^{th}$ stack relative pointer.

91. A stack renamer of claim 89 wherein the plurality of grouped stack renamers containing an $n^{th}$ grouped stack renamer that is coupled in series with an $(n-1)^{th}$ grouped stack renamer, the $n^{th}$ $m_n$-instruction grouped stack renamer comprising:

a first instruction, comprising:

a first adder having an input for receiving a stack top location, a second input for receiving a first relative register location of a first operand of the first instruction, and an output for renaming the first relative register location to a $(3m_1+3m_2+\ldots+3m_{n-1}+1)$ physical register location by summing the stack top location and the first relative register location, the stack top location being set to the same value as a $(3m_1+3m_2+\ldots+3m_{n-1})$ physical register;

a second adder having a first input for receiving the stack top location, a second input for receiving a second relative register location of a second operand of the first instruction, and an output for renaming from the second relative register location to a $(3m_1+3m_2+\ldots+3m_{n-1}+2)$ physical register location by summing the stack top location and the second relative register location; and a third adder having a first input for receiving the stack top location, a second input for receiving a first stack relative pointer of the first instruction, and an output for renaming from the first stack relative pointer to a $(3m_1+3m_2+\ldots+3m_{n-1}+3)$ physical register location by summing the stack top location and the first stack relative pointer;

a second instruction, comprising:

a fourth adder having a first input for receiving the stack top location, a second input for receiving the first stack relative pointer, a third input for receiving a third relative register location of a first operand of the second instruction, and an output for renaming the third relative register location to a $(3m_1+3m_2+\ldots+3m_{n-1}+4)$ physical register location by summing the stack top location, the first stack relative pointer, and the third relative register location;

a fifth adder having a first input for receiving the stack top location, a second input for receiving the first stack relative pointer, a third input for receiving a fourth relative register location of a second operand of the second instruction, and an output for renaming from the fourth relative register location to a $(3m_1+3m_2+\ldots+3m_{n-1}+5)$ physical register location by summing the stack top location, the first stack relative pointer, and the fourth relative register location;

a sixth adder having a first input for receiving the stack top location, a second input for receiving the first stack relative pointer, a third input for receiving a second stack relative pointer of the second instruction, and an output for renaming from the second stack relative pointer to the $(3m_1+3m_2+\ldots+3m_{n-1}+6)$ physical register location by summing the stack top location, the first stack relative pointer, and the second stack relative pointer;

an $m_n{}^{th}$ instruction, comprising:

a $(3m_n-2)$ adder having a first input for receiving the stack top location, a second input for receiving the first stack relative pointer, a third input for receiving the second stack relative pointer, . . . , an $m_n{}^{th}$ input for receiving an $(m_n-1)^{th}$ stack relative pointer of an $(m_n-1)^{th}$ instruction, an $(m_n+1)^{th}$ input for receiving a $(2m_n-1)$ relative register location of a first operand of the $m_n{}^{th}$ instruction, and an output for renaming from the $(2m_n-1)$ relative register location to a $(3m_1+3m_2+\ldots+3m_n-2)$ physical register location by summing the stack top location, the first and second stack relative pointers, . . . , the $(m_n-1)^{th}$ stack relative pointer, and the $(2m_n-1)$ relative register location;

a $(3m_n-1)$ adder having a first input for receiving the stack top location, a second input for receiving the first stack relative pointer, a third input for receiving the second stack relative pointer, . . . , an $m_n{}^{th}$ input for receiving the $(m_n-1)^{th}$ stack relative pointer, an $(m_n+1)^{th}$ input for receiving a $(2m_n)$ relative register location of a second operand of the $m_n{}^{th}$ instruction, and an output for renaming from the $(2m_n)$ relative register location to a $(3m_1+3m_2+\ldots+3m_n-1)$ physical register location by summing the stack top location, the first and second stack relative pointers, . . . , the $(m_n-1)^{th}$ stack relative pointer, and the $(2m_n)$ relative register location; and a $(3m_n)$ adder having a first input for receiving the stack top location, a second input for receiving the first stack relative pointer, a third input for receiving the second stack relative pointer, . . . , an $m_n{}^{th}$ input for receiving the $(m_n-1)^{th}$ stack relative pointer, an $(m_n+1)^{th}$ input for receiving an $m_n{}^{th}$ stack relative pointer of the $m_n{}^{th}$ instruction, and an output for renaming from the $m_n{}^{th}$ stack relative pointer to a $(3m_1+3m_2+ \ldots +3m_n)$ physical register location by summing the stack top location, the first and second stack relative pointers, . . . , and the $(m_n-1)^{th}$ stack relative pointer, and the $m_n{}^{th}$ stack relative pointer.

92. The stack of claim 90 wherein the bit width of the third, sixth, . . . , $(3m_1), (3m_130\ 3), (3m_1+6), \ldots, (3m_2), \ldots, (3m_1+3m_2+ \ldots +3m_{n-1}+3), (3m_1+3m_2+ \ldots +3m_{n-1}+6), \ldots,$ and $(3m_1+3m_2+ \ldots +m_n)$ physical register locations is as wide as the bit width of the stack top location.

93. The method of claim 92 further comprising a first mux having a first input, a second input, an output, and a select signal.

94. The method of claim 93 further comprising a register for storing the stack top location, the register having an input connected to the output of the first mux, an output connected to the first inputs of the first, second, third, fourth, fifth, sixth, . . . , and $3m_1{}^{th}$ adders.

95. The method of claim 94 further comprising a second mux having a plurality of inputs for receiving the third, sixth, . . . , $(3m_1), (3m_1+3), (3m_1+6), \ldots, (3m_2), \ldots, (3m_1+3m_2+ \ldots +3m_{n-1}+3), (3m_1+3m_2+ \ldots +3m_{n-1}+6), \ldots,$ and $(3m_1+3m_2+ \ldots +3m_n)$ physical register locations, an output connected to the first input of the first mux, and a select signal for selecting one of the inputs to be connected to the output.

* * * * *

UNITED STATES PATENT AND TRADEMARK OFFICE
CERTIFICATE OF CORRECTION

PATENT NO. : 5,974,531
DATED : October 26, 1999
INVENTOR(S) : S.-S. Shang et al.

It is certified that error appears in the above-identified patent and that said Letters Patent is hereby corrected as shown below:

COLUMN    LINE
35    12      "$(3m_1 30\ 3)$" should read --$(3m_1 3+3)$--.
(Claim 92,   line2)

Signed and Sealed this

Twenty-fifth Day of July, 2000

Attest:

Q. TODD DICKINSON

*Attesting Officer*      *Director of Patents and Trademarks*